MOBILE RADIO TELEPHONE INTEGRATED SYSTEM

Filed March 2, 1959 21 Sheets-Sheet 1

ADJACENT BAND IS MIRROR IMAGE

INVENTORS: W. A. CORNELL
W. D. LEWIS
BY John C. Albert
ATTORNEY

Jan. 14, 1964 W. A. CORNELL ETAL 3,118,018

MOBILE RADIO TELEPHONE INTEGRATED SYSTEM

Filed March 2, 1959 21 Sheets-Sheet 2

INVENTORS: W. A. CORNELL
W. D. LEWIS

BY John C Albrecht

ATTORNEY

MOBILE RADIO TELEPHONE INTEGRATED SYSTEM

Filed March 2, 1959 21 Sheets-Sheet 3

INVENTORS: W. A. CORNELL
W. D. LEWIS

BY John C Albrecht

ATTORNEY

INVENTORS: W. A. CORNELL
W. D. LEWIS
BY John C Albrecht
ATTORNEY

MOBILE RADIO TELEPHONE INTEGRATED SYSTEM

INVENTORS: W. A. CORNELL
W. D. LEWIS
BY John C Albrecht
ATTORNEY

INVENTORS: W. A. CORNELL
W. D. LEWIS
BY John C A Albrecht
ATTORNEY

Jan. 14, 1964 W. A. CORNELL ETAL 3,118,018

MOBILE RADIO TELEPHONE INTEGRATED SYSTEM

Filed March 2, 1959 21 Sheets-Sheet 7

INVENTORS: W. A. CORNELL
W. D. LEWIS
BY John C Albrecht
ATTORNEY

INVENTORS: W. A. CORNELL
W. D. LEWIS
BY John C Albrecht
ATTORNEY

MOBILE RADIO TELEPHONE INTEGRATED SYSTEM

Filed March 2, 1959 21 Sheets-Sheet 9

INVENTORS: W. A. CORNELL
W. D. LEWIS
BY John C Albrecht
ATTORNEY

Jan. 14, 1964 W. A. CORNELL ETAL 3,118,018

MOBILE RADIO TELEPHONE INTEGRATED SYSTEM

Filed March 2, 1959 21 Sheets-Sheet 10

INVENTORS: W. A. CORNELL
W. D. LEWIS
BY John C Albrecht
ATTORNEY

Jan. 14, 1964 W. A. CORNELL ETAL 3,118,018

MOBILE RADIO TELEPHONE INTEGRATED SYSTEM

Filed March 2, 1959 21 Sheets-Sheet 11

INVENTORS: W. A. CORNELL
W. D. LEWIS
BY John C Albrecht
ATTORNEY

INVENTORS: W. A. CORNELL
W. D. LEWIS
BY John C Albrecht
ATTORNEY

INVENTORS: W. A. CORNELL
W. D. LEWIS
BY John C Albrecht
ATTORNEY

INVENTORS: W. A. CORNELL
W. D. LEWIS
BY John C Albrecht
ATTORNEY

MOBILE RADIO TELEPHONE INTEGRATED SYSTEM

INVENTORS: W. A. CORNELL
W. D. LEWIS
BY John C Albrecht
ATTORNEY

Jan. 14, 1964 W. A. CORNELL ETAL 3,118,018

MOBILE RADIO TELEPHONE INTEGRATED SYSTEM

Filed March 2, 1959 21 Sheets-Sheet 16

INVENTORS: W. A. CORNELL
W. D. LEWIS
BY John C. Albrecht
ATTORNEY

Jan. 14, 1964 W. A. CORNELL ETAL 3,118,018

MOBILE RADIO TELEPHONE INTEGRATED SYSTEM

Filed March 2, 1959 21 Sheets-Sheet 17

INVENTORS: W. A. CORNELL
W. D. LEWIS
BY John C Albrecht
ATTORNEY

MOBILE RADIO TELEPHONE INTEGRATED SYSTEM

Filed March 2, 1959 21 Sheets-Sheet 18

INVENTORS: W. A. CORNELL
W. D. LEWIS
BY John C Albrecht
ATTORNEY

MOBILE RADIO TELEPHONE INTEGRATED SYSTEM

Filed March 2, 1959 21 Sheets-Sheet 19

INVENTORS: W. A. CORNELL
W. D. LEWIS
BY John C Albrecht
ATTORNEY

INVENTORS: W. A. CORNELL
W. D. LEWIS
BY John C Albrecht
ATTORNEY

Jan. 14, 1964 W. A. CORNELL ETAL 3,118,018

MOBILE RADIO TELEPHONE INTEGRATED SYSTEM

Filed March 2, 1959 21 Sheets-Sheet 21

INVENTORS: W. A. CORNELL
W. D. LEWIS

BY John C Albrecht

ATTORNEY

United States Patent Office 3,118,018
Patented Jan. 14, 1964

3,118,018

MOBILE RADIO TELEPHONE INTEGRATED SYSTEM

Warren A. Cornell, Murray Hill, and Willard D. Lewis, Mendham, N.J., assignors to Bell Telephone Laboratories, Incorporated, New York, N.Y., a corporation of New York Filed Mar. 2, 1959, Ser. No. 796,680
34 Claims. (Cl. 179—15)

This invention relates in general to communication systems and more particularly to integrated mobile radio telephone systems.

Both private and common carrier mobile radio telephone systems are used extensively throughout the United States and other portions of the world. Such systems generally operate on a party-line basis wherein as many as a hundred users in one geographical location may share a single radio frequency assignment. The portion of the radio frequency spectrum reserved for mobile radio services is limited, and the majority of these frequencies are shared between several FCC licensees. In the Common Carrier case, frequency assignments are on a geographical basis to prevent interference between stations; however, in a majority of FCC radio services such as Fire, Police, Industrial Radio, et cetera, frequencies are assigned without great regard for geographical separation. Such arrangements serve to further degrade the services rendered to subscribers on a party-line basis, and thereby limit the utility of such systems.

In many large cities, several radio frequency assignments are committed to Common Carrier service. In these situations, the assignments are operated as a plurality of party lines wherein a subscriber is permanently assigned to a particular one of the plurality of radio frequency assignments. This arrangement is wasteful of radio frequency spectrum in that a subscriber may be waiting for service on one channel while another channel, to which he does not have access, is idle.

Further, there is difficulty in providing a continuity of service for a subscriber who travels over wide geographical limits since the same frequency assignment is not made in all possible geographical locations.

It is a general object of this invention to more fully utilize mobile radio frequency assignments.

It is another object of this invention to serve a mobile radio customer without interference from other subscribers.

It is another object of this invention to selectively call subscribers without alerting other subscribers.

It is another object of this invention to alert subscribers without loading the radio frequency channel between the time a signal to the subscriber is initiated, and the time the answer of the called subscriber is detected.

It is another object of this invention to detect requests for service and provide a customer with a message channel assignment in accordance with his service requirements.

It is another object of this invention to compensate for variations in the frequency of high frequency local oscillators employed in the mobile radio stations.

It is another object of this invention to prevent false operation of a mobile receiver and attendant logic circuitry in the presence of radio frequency fading or noise.

It is another object of this invention to permit a mobile subscriber to directly dial the number of a land station or another mobile station.

It is another object of this invention to permit a subscriber to travel over wide geographical limits and to automatically or manually assume a radio frequency block assignment in accordance with a transmitting frequency of a nearby land station.

The above and other objects of this invention are achieved in one illustrative embodiment wherein a broadband base station, herein termed a Radio Central, having a plurality of message channel assignments, and a pair of data channel assignments is employed in conjunction with a plurality of mobile radio telephone subscriber stations each having a transmitter and a combined message and data receiver. The mobile radio receiver has but a single broadband frequency channel; however, it employs two intermediate frequency channels. The first is a relatively broadband channel with accepts control data over a pair of carrier frequency channels. The first data channel carrier frequency is near the top bandpass frequency of the data IF channel and the second data channel carrier frequency is near the low frequency cutoff of the data IF channel. The pair of data channels provide redundancy to increase the system reliability. The other or message intermediate frequency channel has a narrow pass band and any selected one of a plurality of message service channels is passed through the message IF circuitry in accordance with the tuning of a channel selecting oscillator.

The mobile stations are served on a time division basis by a high speed common control associated with the base station radio equipment. From time to time, Radio Central interrogates the mobile stations as a group to detect requests for service, and having detected a request, proceeds to identify the requesting mobile station; establishes transmission connections in accordance with the desires of the subscriber requesting service, and having once established the necessary connections, supervises the call to detect a disconnect request and to subsequently release the connection.

Each mobile station may be tuned to any one of a plurality of blocks of transmitting and receiving frequency assignments, and to any one of a plurality of transmitting and receiving channel assignments in any one of the transmitting and receiving frequency blocks. Further, base stations are provided over wide geographical limits, and transmitting and receiving frequency block assignments are made in accordance with a predetermined systematic pattern. Accordingly, as a mobile station goes beyond the service range of a particular base station, the mobile transmitter and receiver are either automatically or manually shifted to permit communication with a base station operating on a different block of frequency assignments.

In accordance with one feature of this invention, the radio frequency channels are efficiently employed by assigning a message channel to a mobile station in accordance with its service requirements.

In accordance with another feature of this invention, a message channel is assigned to an individual subscriber for the duration of a speech burst.

In accordance with another feature of this invention, fully selective signaling is employed in the calling of mobile subscribers.

In accordance with still another feature of this invention, signaling tones are initiated in a mobile station by means of a message comprising a subscriber address code and a function code discrete to the particular desired tone.

In accordance with another feature of this invention, subscribers are periodically interrogated to detect requests for service.

In accordance with another feature of this invention, for a mobile subscriber originating a call, there are recorded in the central office Common Control codes representative of the destination of this call.

In accordance with still another feature of this invention, a subscriber station which has requested service is given a short pseudo-address which it employs for the duration of the call.

In accordance with another feature of this invention, mobile subscribers who have received service are periodically interrogated to detect the initiation of speech bursts so that a message channel frequency assignment can be made in accordance with the subscriber's requirements.

In accordance with another feature of this invention, radio receiver intermediate frequency converters and oscillators are arranged to nullify the effects of variations in local oscillator frequency.

In accordance with another feature of this invention, means are provided to disable a mobile receiver whenever the received data carrier signal falls below a usable level.

In accordance with another feature of this invention, a mobile subscriber is given dial tone and permitted to directly dial or otherwise signal the number of a called land station or another mobile station.

In accordance with another feature of this invention, means are provided in the mobile station to permit a mobile receiver and transmitter to be tuned to any one of a plurality of radio frequency block assignments.

The above and other objects and features of this invention will be more readily understood from the following discussion when read with reference to the drawing, in which.

Figure 23:
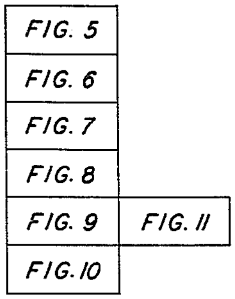
Figure 12:
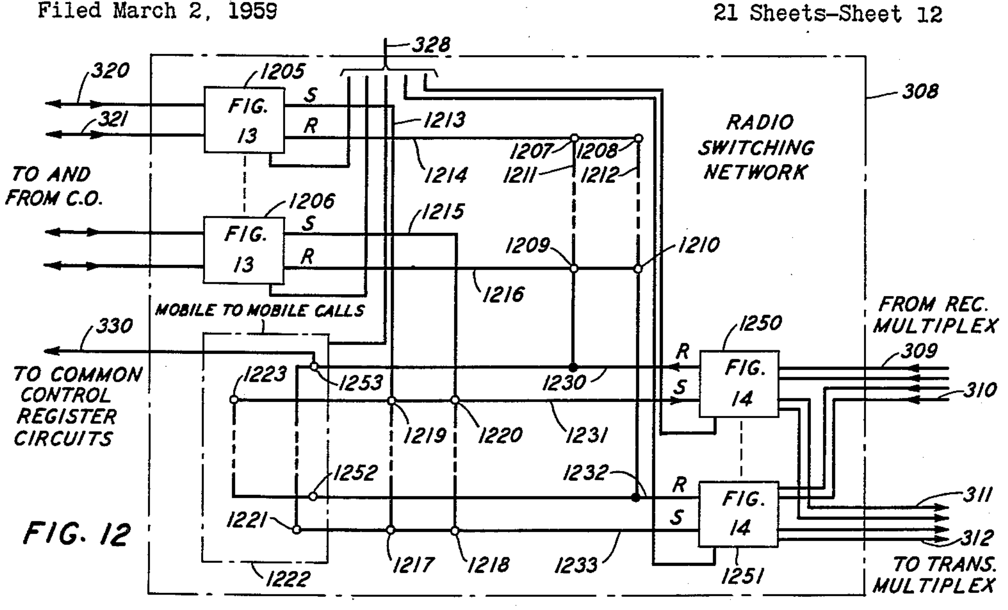
Figure 14:
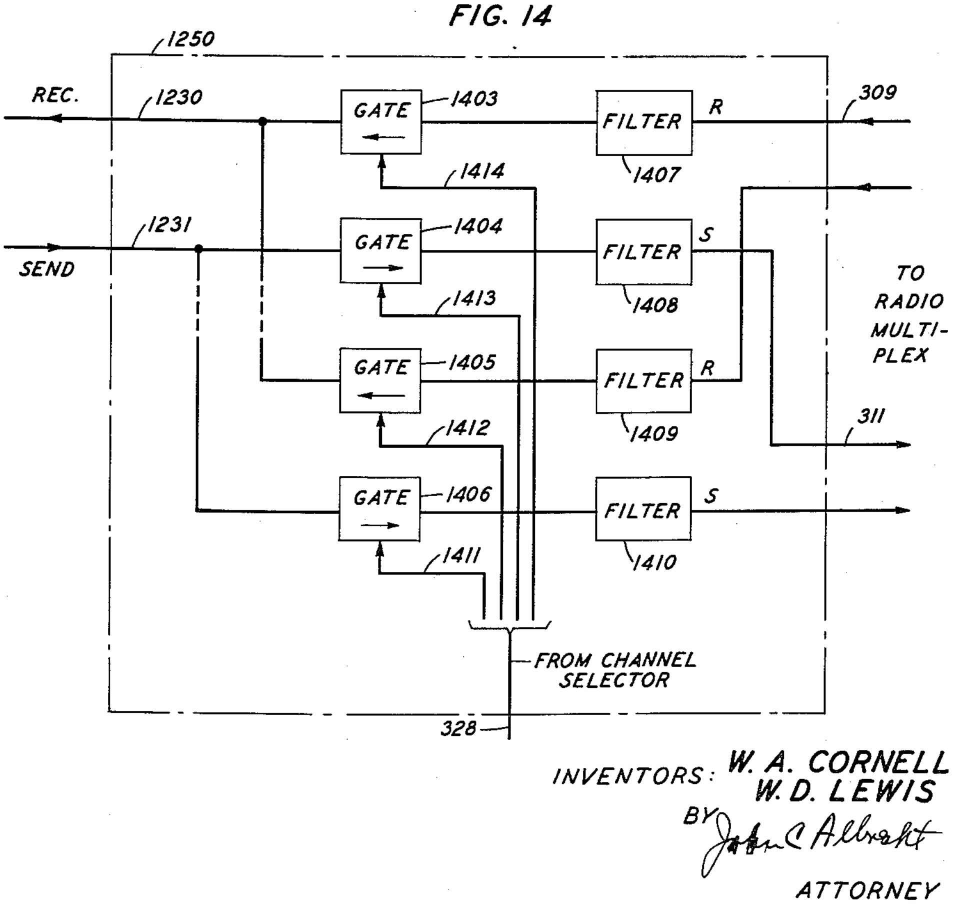
Figure 13:
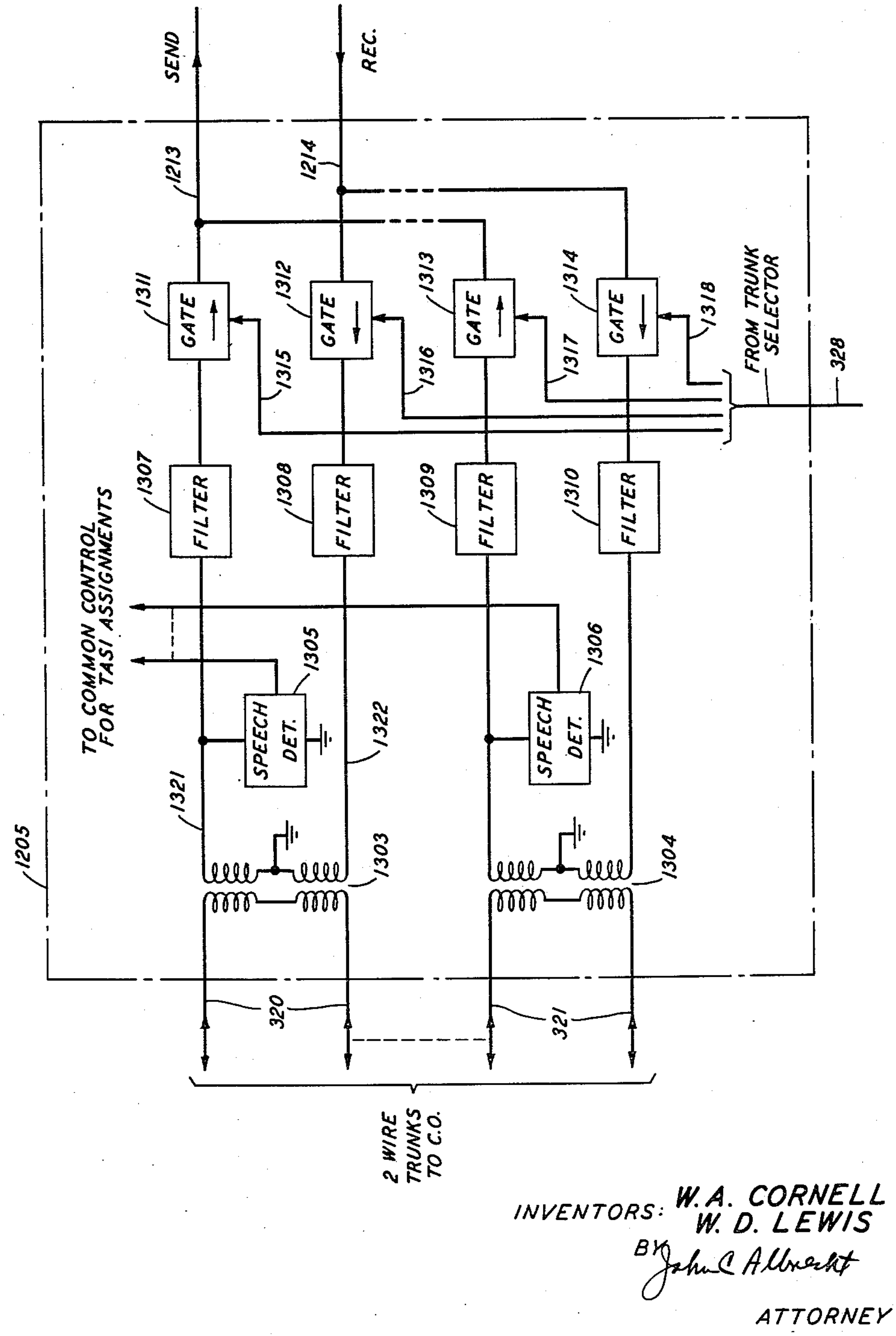

FIGS. 8–11 comprise control logic responsive to data signals from the Radio Central;

FIG. 12 is a schematic representation of a radio switching network;

FIG. 13 is a schematic representation of two-wire to four-wire trunks between the radio switching network and the land central office;

FIG. 14 is a schematic representation of the gating arrangements between the radio switching network and the radio multiplexing equipment;

FIGS. 15–22 comprise timing diagrams showing the timing of actions within a mobile station upon receipt of the indicated function codes; and FIG. 23 is the key figure showing the arrangement of FIGS. 5–11 inclusive.

In the drawing, circuit elements are labeled in accordance with both functional designations and numerical designations. The numerical designations indicate the figure in which the circuit element is shown and in the case of conductors or other elements which appear in more than one figure, and the label indicates the figure in which the conductor or other element was first shown. In the case of three digit labels, the first digit indicates the figure, while in the case of four digit labels, the first two digits indicate the figure. A timing and control cable designated 566 is employed throughout FIGS. 5–11 of the drawing to simplify the representation of the circuit details and to avoid the confusion attending the portrayal of all interconnections in the system without the use of a cable. Conductors entering the cable are provided with arrowheads at the point of entrance while conductors leaving the cables are merely shown with connecting dots at the point at which the coductor leaves the cable.

*Allocation of Radio Frequency Space*

Figure 1:
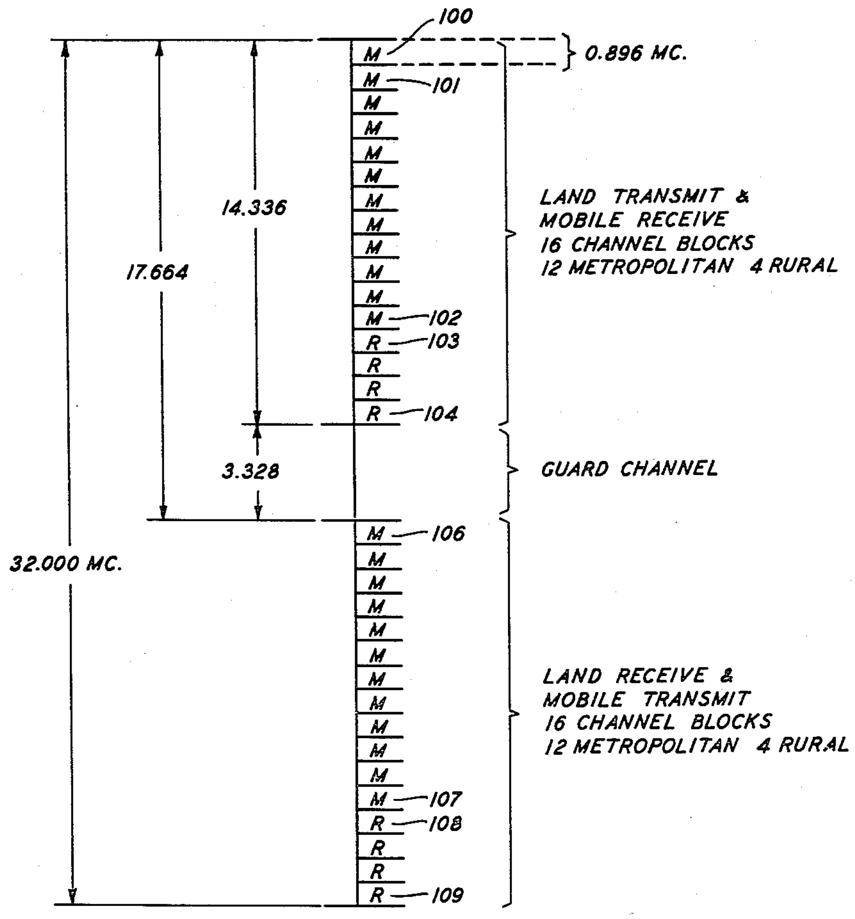
FIG. 1 shows the arrangement of transmit and receive channel blocks.

The implementation of a system of the type described herein requires the assignment of blocks of space in the radio frequency spectrum. In FIG. 1 there is shown a suggested assignment pattern for utilization of a 32 megacycle section of the radio frequency spectrum. Of this 32 megacycle band, a 14.336 megacycle segment is reserved for transmission from the land stations to mobile stations, another 14.336 megacycle segment is reserved for transmission from the mobile stations to the land stations, and a 3.328 megacycle segment is reserved as a guard channel between land transmit and land receive frequency blocks. Each of the transmit blocks such as 100, 101, 102, 103, and 104, and each of the land receive blocks such as 106, 107, 108, and 109 occupies 0.896 megacycles. In FIG. 1, there are frequency blocks such as 100, 101, and 102 which are designated M and others such as 103 and 104 which are designated R. The M blocks in this one illustrative embodiment are reserved for use in metropolitan areas while the R blocks are reserved for rural areas. This is similarly true of the land receive M blocks 106 and 107 and the land receive R blocks 108 and 109.

Figure 2:
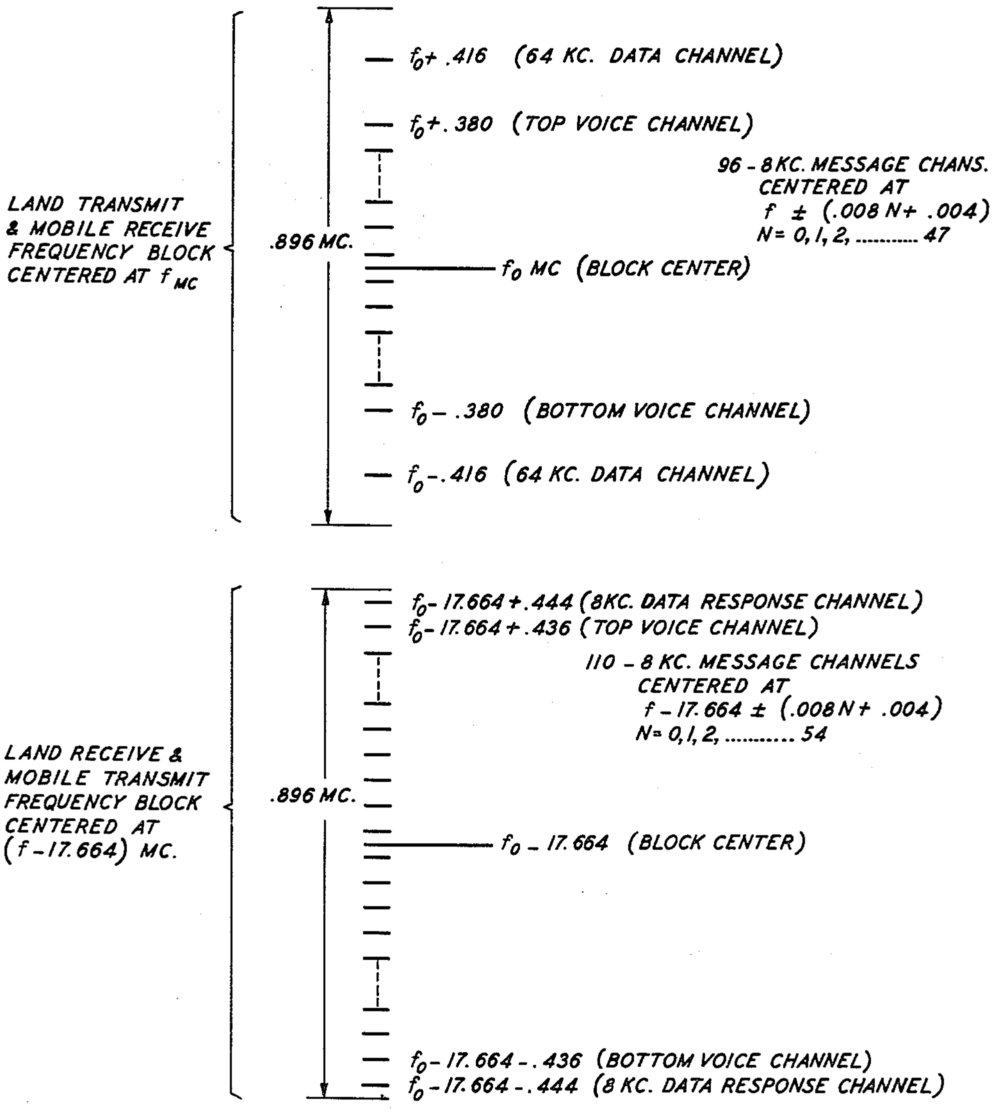
FIG. 2 shows the arrangement of data and speech channels within a frequency block.

The details of channel assignments within a frequency block are shown in FIG. 2. In the upper half of FIG. 2 there is shown a land transmit and mobile receive frequency block centered at $f_0$ megacycles and land receive and mobile transmit frequency block centered at ($f_0$—17.664) megacycles. The arrangements of FIG. 2 are therefore representative of assignments within a pair of blocks such as 100 and 106 of FIG. 1.

In both directions of transmission, there are twin data channels and a plurality of selectively employed voice channels. As will be seen later in the description of this system, there is materially more information to be transmitted from the Radio Central to the mobile stations via the data channel than from the mobile stations to Radio Central. Accordingly, in the land transmit and mobile receive frequency block, there are two 64 kilocycle data channels centered 0.416 megacycle above and below the block center frequency. The upper data channel extends from $f_0+0.384$ megacycle to $f+0.448$ megacycle and the lower data channel extends from $f_0-0.384$ megacycle to $f_0-0.448$ megacycle.

In the mobile transmit and land receive frequency block, there are two 8 kilocycle data channels centered 0.444 megacycle above and below the block center of $f_0-17.664$ megacycles. Since the land transmit and mobile receive frequency block and the mobile transmit land receive frequency block are each 0.896 megacycle wide, the former can accommodate fewer 8 kc. message channals than the latter. In the land to mobile direction, there are ninety-six 8 kilocycle message channels centered at $f_0\pm(0.008N+0.004)$ where $N=0, 1, 2, \ldots 47$. The top voice channel in the land transmit direction is centered at $f_0+0.380$ megacycle and the bottom voice channel at $f_0-0.380$ megacycle.

In the mobile transmit and land receive direction, there are one hundred and ten 8 kilocycle message channels centered at $f_0-17.664\pm(0.008N+0.004)$ where:

$$N=0, 1, 2, \ldots 54$$

The top voice channel in the mobile transmit and land receive direction is centered at $f_0-17.664+0.436$ megacycles, and the bottom voice channel at $f_0-17.664-0.436$ megacycles.

As indicated above, the information capacity of the Radio Central to mobile data channel is greater than that of the mobile to Radio Central data channel; however, subscriber dial signaling is performed over mobile to Radio Central message channels, and therefore, the number of mobile to Radio Central message channels is advantageously made larger than the number of Radio Central to mobile message channels.

*Radio Central*

Figure 3:
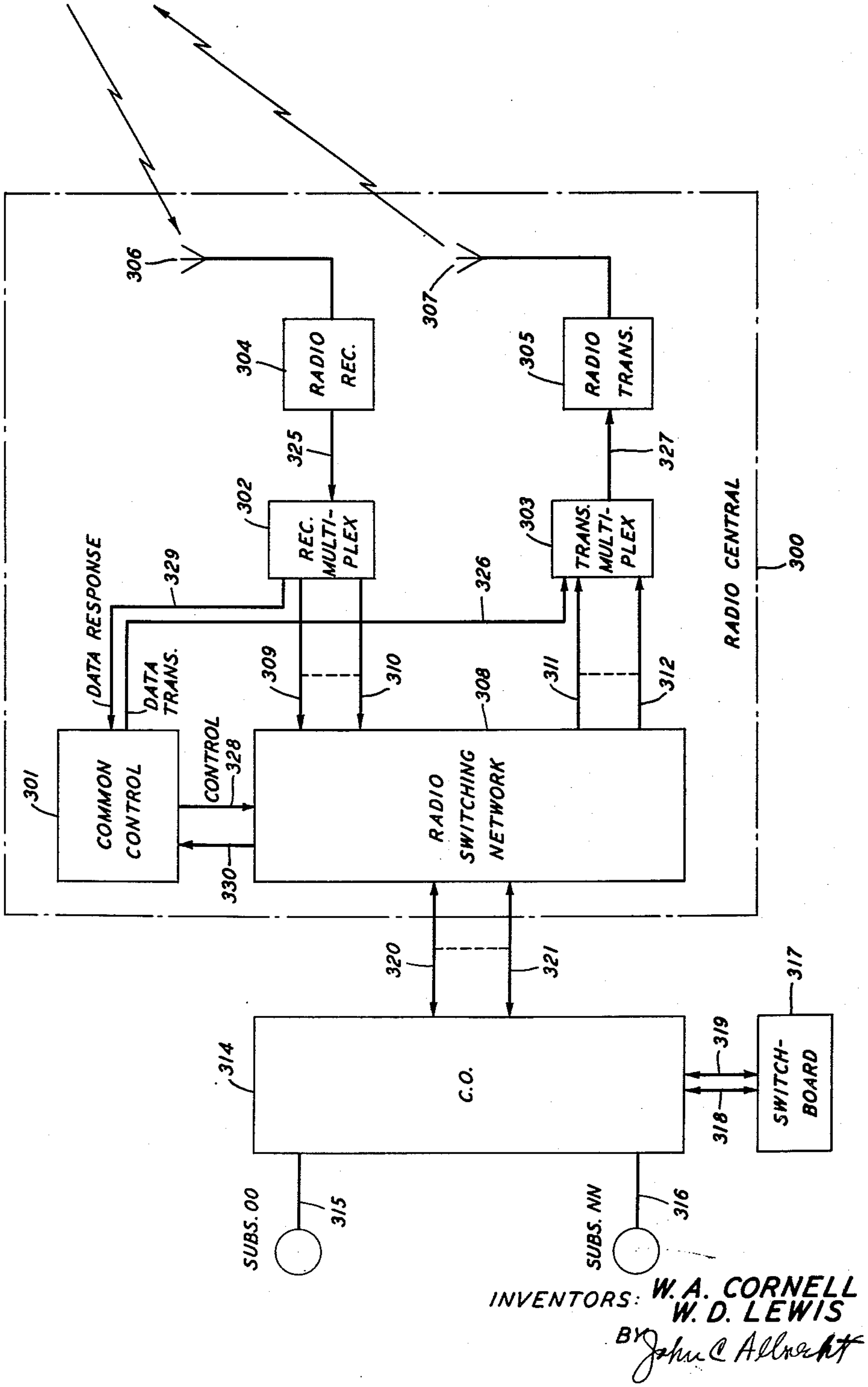
FIG. 3 is a block diagram representation of an integrated mobile radio telephone land station.

In FIG. 3, there is shown in block diagram form, a Radio Central 300 including arrangements for controlling mobile stations such as will be described herein and there is also shown a Land Telephone Central Office 314 with its associated Subscriber Lines 315 and 316 and Switchboard 317.

Common Control 301 comprises logic and memory circuitry for generating data messages such as will be described later; means responsive to answers to these data messages for varying the content of subsequent data messages; and means for controlling the Radio Switching Network 308 and the Telephone Central Office 314.

Data messages are transmitted from the Common Control 301 to the Transmitting Multiplex 303 via Conductor 326. In Transmitting Multiplex 303, the frequency assignments such as are shown in FIG. 2 are implemented.

The data signals on Conductor 326, after being processed in the Transmitting Multiplex 303, are combined with frequency multiplexed speech signals in accordance with information from trunks such as 311 and 312 on Conductor 327 for transmission to the Broadband Radio Transmitter 305. The signals on Conductor 327 are maintained in the frequency relationship shown in the upper half of FIG. 2; however, these signals are not in a band centered about $f_0$ megacycles which is the center frequency of the signal at Antenna 307, but rather at some much lower baseband having a center frequency in the order of 500 kilocycles.

Signals from the mobile station are received by Antenna 306 and in the Broadband Radio Receiver 304 are reduced to a baseband frequency for transmission to the Receiving Multiplex Equipment 302. At the Receiving Multiplex 302, the data signals are separated from the speech signals and transmitted via Conductor 329 to the Common Control 301 while the voice signals are transmitted via trunks such as 309 and 310 to the Radio Switching Network 308.

The Radio Switching Network 308 provides means for connecting one mobile station to another; for connecting a mobile station to a land subscriber or a switchboard and for connecting a mobile station to register circuits in the Common Control 301.

In a system of the type described herein, the major portion of the traffic is between mobile stations and land subscribers and only a minor portion between mobile stations. Therefore, there is no concentration in the radio switching network between the central office trunks and the trunks to the radio multiplexing equipment. Further, there is full access between the central office trunks and the switching network trunks to the radio multiplexing equipment.

The radio switching network and connections between it and the central office and the radio multiplexing equipment are shown schematically in FIGS. 12, 13, and 14.

In FIG. 12, there is shown in block diagram form a time and space division switching network to provide connections between the Land Central Office 314 and the Receiving and Transmitting Multiplexing Arrangements 302 and 303, respectively; to provide inter-mobile connections between Receiving Multiplex 302 and the Transmitting Multiplex 303; and to provide connections from the Receiving Multiplex 302 and the Common Control 301. The trunks to the central office such as 320 and 321 are bidirectional two wire balanced lines and the trunks to the transmitting and receiving multiplexing equipment are unidirectional unbalanced lines. The Modules 1205 and 1206 are time division blocks such as are shown in FIG. 13. The Modules 1250 and 1251 are time division arrangements such as shown in FIG. 14.

FIG. 12 is a block diagram of a non-blocking pulse amplitude modulation time and space division network for interconnecting radio multiplexing channels, and for connecting such channels to central office trunks, and to register circuits in common control. Unidirectional time division gates are employed throughout and these gates are selectively enabled by signals from Common Control 301 over the control conductors in Cable 328. As will be later explained, the transmitting and receiving multiplex channels are employed on a time assignment basis and therefore are assigned independently of each other. In a non-blocking network, in which the transmitting and receiving multiplex trunks are equal in number, the number of two wire bidirectional central office trunks entering FIG. 12 is equal to the sum of the transmitting and receiving unidirectional radio multiplexing channels entering FIG. 12. That is, if there are 100 receiving multiplex channels such as 309 and 310 and 100 transmitting multiplex channels such as 311 and 312, there will be provided 200 two wire trunks such as 320 and 321.

These numbers are illustrative of the theory of a non-blocking network and are not representative of the actual number of trunks which would be required for a Radio Central switching network. In the arrangements of FIG. 2, there are shown 96 Radio Central to mobile multiplexed message channels and 110 mobile radio to Radio Central channels. In this situation, it is not possible to use the sum of the transmitting and receiving multiplex channels directly in arriving at the number of central office trunks as in the above example. With the stated number of multiplexing trunks there are approximately 192 two-way trunks to the central office and an undesignated number of register trunks such as 330. The number of register trunks is determined by signaling speed and system loading. Since a Radio Central serves several channel frequency blocks, a Radio Central switching network such as 308 serves several hundred radio multiplexing trunks and similarly several hundred central office trunks.

The two wire switching modules such as 1205 and 1206 are arranged as shown in FIG. 13. That is, a plurality of bidirectional two wire trunks such as 320 and 321 are switched on a time division basis to the Module Send and Receive Conductors 1213 and 1214. The transformers such as 1303 and 1304 provide a transition from the bidirectional trunks to unbalanced unidirectional lines such as 1321 and 1322. The speech detectors such as 1305 and 1306 are employed to provide signals to common control in response to the origination of a speech burst on the two wire trunk. In response to such signals, Common control 301 originates gating signals to provide the desired connections through the network. Filters such as 1307 through 1310 are employed to provide speech channels having the desired transmission characteristics. The unidirectional transmission gates such as 1311 through 1314 are controlled by signals from common control over conductors such as 1315 through 1318 in Cable 328. These gates are individually operated on a time division basis and only one transmit and one receive gate of a module may be operated at any one particular time. Treating the gates associated with a particular two wire trunk as a pair, both gates of a pair would not be simultaneously operated. That is, Gates 1311 and 1312 would not be operated together nor would 1313 and 1314; however, Gate 1311 and Gate 1314 may be simultaneously operated, and Gates 1312 and 1313 similarly might be simultaneously operated.

The four wire switching modules such as 1250 and 1251 are shown in FIG. 14. Each receiving line from the radio multiplex such as 309 and 310 terminates in a filter such as 1407 and 1409, and each multiplex send line such as 311 and 312 is similarly connected to the output of a filter such as 1408 and 1410. The Unidirectional Transmission Gates 1403–1406 are selectively controlled by signals from the Common Control over conductors in Cable 328. The Receiving Gates 1403 and 1405 provide means for selectively connecting the receiving multiplex channels to the Receiving Multiplex Link 1230, and the Transmit Gates 1404 and 1406 provide means for selectively connecting the Send Link 1231 to the transmitting multiplex channels.

As shown in FIG. 12, all of the send lines from the two wire modules such as 1205 and 1206 are shown as having access to all of the send lines of the modules such as 1250 and 1251. Also, the receive lines of the modules such as 1250 and 1251 have access to the receive lines of the modules such as 1205 and 1206. Access from the send lines of FIG. 13 to the send lines of FIG. 14 is by means of time division gates such as 1217 through 1220, the access from the receive lines of FIG. 14 to the receive lines of FIG. 13 is by means of the time division gates such as 1207 through 1210.

Assume, for example, that a two wire trunk such as 320 is to be connected to a receiving multiplex trunk such as 309 in a particular time slot. During that particular time slot, the Gates 1403, 1207, and 1312 are simultaneously operated to effect the desired connection. In the connection of the two wire Trunk 321 to the Transmitting Multiplex Channel 1239, the Gates 1313, 1219, and 1406 are simultaneously energized to effect the connection.

Mobile to mobile calls are established through the crosspoints of 1222. In these arrangements, a mobile to mobile connection is not completed through a single module such as 1250 or 1251, but rather between modules such as 1250 and 1251. For example, in the connection of Receiving Multiplex Trunk 309 and Transmitting Multiplex Trunk 312, the Receiving Gate 1403, a connecting gate such as 1221, and a sending gate such as 1406 in a second module would be simultaneously energized. In these arrangements, a mobile to mobile call is served in a single time slot; however, there is no reason why time slot frogging arrangements may not be advantageously employed to provide intermobile service on a frogged time slot basis in which case transmit and receive channels of a single module may be interconnected.

In a non-blocking radio switching network in which the problem of connecting receiving multiplex to common control register trunks is avoided, and wherein it is assumed that the number of receiving multiplex trunks is equal to the number of transmitting multiplex channels the number of gates required can be calculated as follows: where N is the total number of pairs of one-way radio multiplexing channels and $n$ is the number of pairs of multiplexing channels per channel group, there are required $N/n$ radio channel groups, $2N/n$ central office trunk groups, and $2n-1$ time slots. The number of junctor gates such as 1207 through 1210 and 1217 through 1220 for land to mobile and mobile to land interconnections $4N^2/n^2$. In addition, $$\frac{N}{M}\left(\frac{N}{M}-1\right)$$

junctor gates, such as 1220 and 1221, are required for mobile to mobile interconnection and an undesignated number of gates such as 1251 and 1252 are required to provide connections to the common control register trunks.

The Central Office 314 is one of the many standard automatic central offices and the Common Control 301 provides means for pulsing to and thereby selecting subscriber stations within the Central Office 314. The Switchboard 317 provides to subscribers served by the radio switching system the normal services performed by an operator associated with a land central office. Such services are, for example, information, trouble reporting, long distance, and assistance in completing calls.

The common control will not be described herein in detail; however, a highly flexible common control such as is disclosed in the copending application of W. A. Budlong, G. G. Drew, and J. A. Harr, Serial No. 688,386, filed November 7, 1957, now Patent No. 2,955,165, may advantageously be arranged to perform the functions which will be described.

*General System Operation*

Before proceding to a detailed description of the data message signals transmitted from common control to mobile stations served by the radio switching system and the data responses from the mobiles to the land radio switching system, a general description of the system mode of operation will be given as background information to understanding the detailed messages.

Automatic switching systems generally employ two plans for detecting requests for service. Many electromechanical switching systems, such as step-by-step systems, provide line equipment at a central office, which is responsive to changes in supervisory state of a subscriber's line or trunk. Other systems, for example, the electronic switching systems disclosed in the above-cited copending application of Budlong et al., and in the copending application of D. B. James, J. D. Johannesen, M. Karnaugh, and W. A. Malthaner, Serial No. 760,502, filed September 11, 1958, now Patent No. 2,957,949, scan subscriber's lines and trunks at a relatively high rate to detect instantaneous supervisory states, and thereby recognize requests for service, answers, hangups, and dial transitions. The radio switching systems of the present invention generally employs this latter mode of operation. However, it deviates therefrom in that the scanning signal is not, as is the case in above-cited electronic switching systems, directed to a particular line or trunk but rather is directed to the mobile subscriber stations within range of the switching system radio transmitter as a body. That is, a data message is transmitted from the land central stating "any station having a request for service signify your request by sending your station address to the Radio Central via the return data channel." The address referred to above herein termed the Nationwide Address, is the identifying code assigned to each mobile subscriber. As discussed previously, a radio switching system of the type described herein will serve wide geographical limits, possibly the entire United States, on an integrated basis; therefore, a multidigit code is required to define each of the possible mobile subscribers. It is possible that ten or more digits are required in such a multidigit Nationwide Address.

As will be seen later in this description, there is occasion for the transmission of many data messages from the Radio Central to a mobile station which has requested service. To conserve information capacity in the data channel from the Radio Central to the mobile stations a pseudo-address to be employed for the duration of a call is assigned to a station that has requested service. That is, once a request for service has been detected, the Radio Central addresses the subscriber requesting service by means of the full Nationwide Address, and directs the subscriber to assume for the duration of the current call a pseudo-address having relatively few digits compared to the number of digits in the Nationwide Address. Accordingly, in subsequent data transmissions from the Radio Central to the served subscriber, considerable message capacity is saved in that the pseudo-address is employed to direct information to a subscriber rather than the full Nationwide Address.

A similar arrangement to conserve message capacity is employed in transmissions to a called or terminating mobile subscriber. That is, Radio Central addresses a called subscriber with the full Nationwide subscriber code and advises the addressed subscriber to assume a pseudo-address code for the duration of the call to that subscriber. This message to the terminating subscriber also starts ringing within the called mobile station to alert the subscriber and requests an acknowledgment by the mobile station. The acknowldgment indicates that the subscriber is within range of the Radio Central and has received the message.

To conserve message channel capacity, a message channel is provided between a mobile subscriber and the radio switching network only during active speech periods. That is, speech channels are provided to a mobile station only in accordance with the message requirements. This is accomplished by means of Radio Central originated data messages which state "any station having a need for a speech channel, as indicated by the energization of a speech detector in the mobile, respond to the Radio Central to indicate such need." Scans for speech service requests are provided at extremely short intervals in the scanning cycle so that a speech channel can be provided without mutilation of speech signals. Time assignment of channels between points of communication has been previously described in Patent 2,541,932 of A. E. Melhose which issued on February 13, 1951. Such arrangements have been commonly referred to as Time Assignment Speech Interpolation systems normally abbreviated as TASI. The particular manner in which the subscriber requesting TASI service is served will be described with respect to the detailed Radio Central to mobile station data messages as several data messages are required to identify a subscriber making a TASI assignment.

Having detected a TASI request originating from a land station or from a mobile station connected to a second mobile station, the Radio Central must assign a talking channel between the radio switching network and the receiver in the mobile station to which the speech is directed. Consequently, one data message is arranged to address a terminating subscriber with a pseudo-address code and assign a receiver frequency to be employed by that subscriber.

Other data messages are required to introduce tones such as ringing induction, busy, and not available tones in the subscriber mobile stations, and still others are required to scan called mobile subscriber stations to detect an answer, to release a channel assigned to a subscriber and to restore or remove supervisory tones from a mobile subscriber station.

*Mobile Station*

Figure 4:
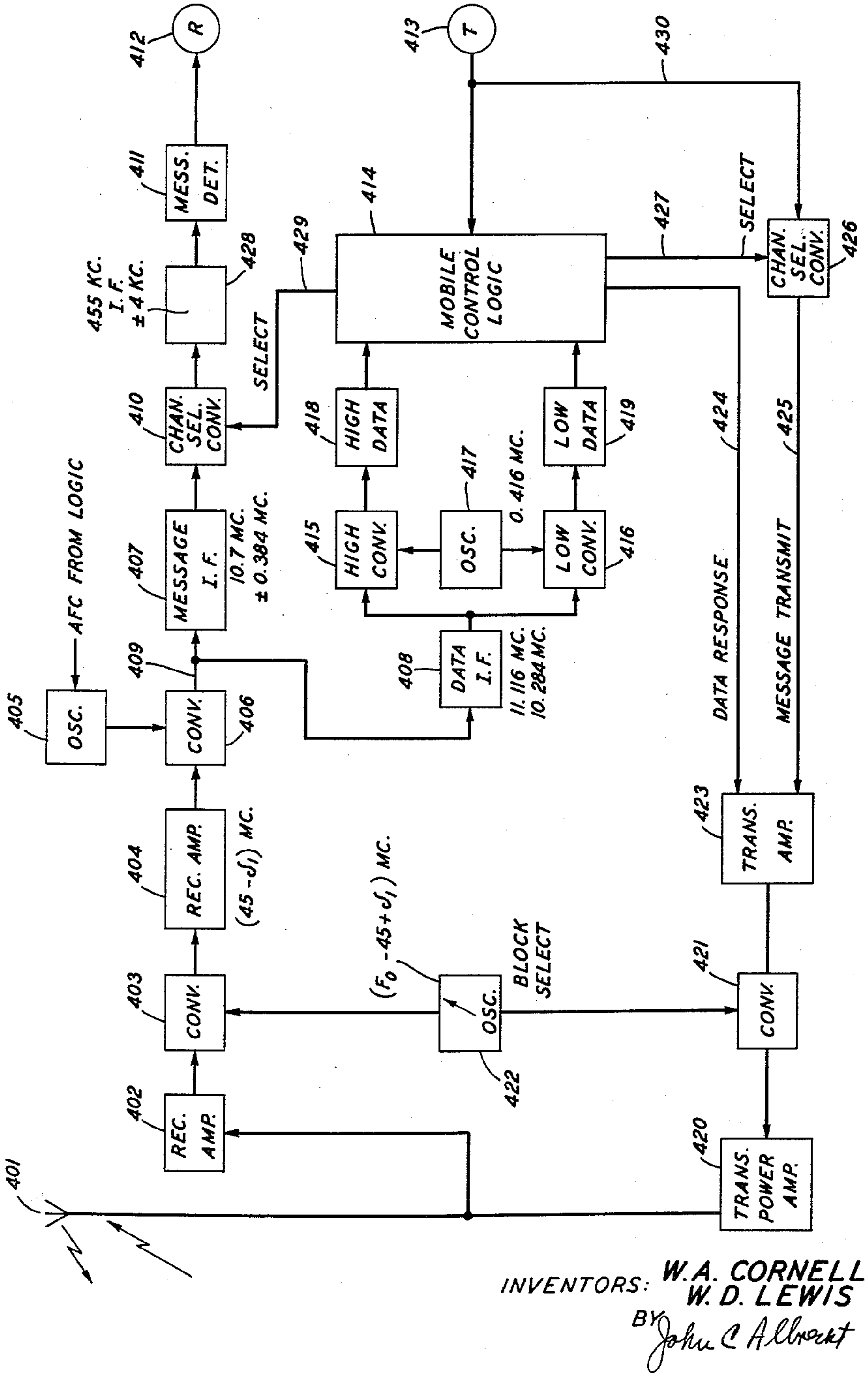
FIG. 4 is a block diagram representation of a mobile station.

A typical mobile subscriber station is shown in block diagram form in FIG. 4. The mobile station comprises a radio transmitter and receiver which are arranged to handle both data and speech information in both directions of transmission; and mobile control logic responsive to the data messages from the Radio Central to control the mobile transmitter and receiver and to generate data messages for transmission to the Radio Central. Radio signals from Radio Central are received through Antenna 401, Receiving Amplifier 402, Converter 403, Receiving Amplifier 404, Converter 406, and at this point the data messages are transmitted through the Data IF Circuitry 408, and thereby separated from the speech messages which are transmitted through the Message IF Circuitry 407.

There are two input signals to the Converter 403. The first signal being the combined message and data signals from the Radio Central, and these signals are radio frequency signals spaced in accordance with the assignments of FIG. 1. The second signal to the Converter 403 is a radio frequency signal which is below the incoming signal from Amplifier 402 by approximately 45 megacycles, which is the first or combined IF center frequency. As will be seen later with respect to a description of the detailed transmitter and receiver circuitry of FIG. 6, the signal through Receiving Amplifier 404 may be slightly different than 45 megacycles, and this difference in frequency is due to errors in the setting of the Block Select Oscillator 422. Such errors are caused by variations in temperature or voltage, component aging, et cetera. Further, it will be shown with respect to the description of FIG. 6 that provisions are made in the mobile station to overcome deviations from desired settings, not only in the Block Selector Oscillator 422 but also in other high frequency converting oscillators in the system.

A second conversion occurs in the Difference Converter 406 wherein the first IF frequency is mixed with the output from Oscillator 405 which operates at approximately 34.3 megacycles. The output from Converter 406 is connected through Conductor 409 to the Message IF Circuitry 407 and the Data IF Circuitry 408 in parallel. The signal on Conductor 409 is centered at approximately 10.7 megacycles. As seen in FIG. 2, the data channels are located 0.416 megacycle above and below the block center frequency. Since there is no frequency division between the Antenna 401 and the Conductor 409, the data channels and the message channels remain in the same relative positions and with the same frequency spacing as existed at the Radio Central transmitter. Accordingly, with a second IF center frequency of 10.7 megacycles, the lower data channel occurs at 10.284 megacycles and the upper data channel at 11.116 megacycles. The data IF amplifier therefore passes an 0.896 megacycle band of signals centered about 10.7 megacycles. This band includes the message information.

The signal from the Data IF Amplifier 408 comprises one of two signals to the Data Converters 415 and 416. The second input to each of these converters is the output of Oscillator 417 which operates at 0.416 megacycle. The Low Data Converter 416 is a summing converter, that is, its output signal has a frequency which is the sum of the frequencies of the two input signals while the High Data Converter 415 is a difference converter, and its output signal frequency is the difference between the frequencies of the two signals. The 10.284 low data channel is combined with the 0.416 megacycle signal from Oscillator 417 in Converter 416 to provide a 10.7 megacycle signal to the Low Data Amplifier 419. The high data signal of 11.116 megacycles is combined with the 0.416 megacycle signal from Oscillator 417 in Converter 415 to provide a 10.7 megacycle signal to the High Data Amplifier 418, thereby the twin data channels which are transmitted from Radio Central to a mobile station are both converted to signals centered at 10.7 megacycles for use in the mobile Control Logic 414. As will be seen with respect to a description of FIG. 5, the 10.7 megacycle data signal is employed not only to control the mobile control logic, but is also employed to develop an AFC signal for stabilization of the Oscillator 405.

The message channels appear on Conductor 409 in a band extending ±0.384 megacycle above and below the center frequency of 10.7 megacycles. The desired channel is selected by means of the Channel Select Converter 410 which has as one input a select signal on Conductor 429. The signal on Conductor 429 is chosen so that when it combines with the desired message channel signal at the output of the Message IF 407, a 455 kilocycle speech low IF signal will be produced. The low IF speech signal has approximately an 8 kilocycle bandwidth and is centered at 455 kilocycles. This signal is deteced and thereby restored to speech in Message Detector 411, and is thereafter transmitted to the Telephone Receiver 412.

There are two types of messages from a mobile station to Radio Central. The first type being data responses, and the second, message signals. Data responses are transmitted from a mobile station to Radio Central on a pair of frequency assignments common to all mobile stations being served in a frequency block. As shown in FIG. 2, the data response channels are 8 kilocycle channels centered 0.444 megacycle above and below the mobile transmit land receive block center frequency of $f_0-17.664$ megacycles. The nature of data response signals will be fully described with respect to FIGS. 5 through 10.

Message signals originating in the Telephone Transmitter 413 are connected via Conductor 430 and Channel Selection Converter 426 to the Transmitting Amplifier 423. The signal on Conductor 427 is chosen so that the speech signals from Conductor 430 are shifted in the frequency spectrum to the proper baseband frequency for transmission to Radio Central. The output signals from Transmitting Amplifier 423 are combined in the Converter 421 with the output of the Block Select Oscillator 422. Accordingly, signals from the Transmitting Amplifier 423 are shifted into the desired frequency block for amplification in the Transmitting Power Amplifier 420 and transmission to Radio Central via Antenna 401.

*Data Messages*

Before proceeding to a detailed description of FIGS. 5 through 10, the details of the Radio Central to mobile station data messages will be disclosed in the following table. In this table, a number of abbreviations have been used. Certain of the abbreviations are defined in the table, while others are not. Those which are not defined in the table will be discussed at this time.

Each Radio Central to mobile station data message is preceded by a Start signal and terminates with an End signal. The Start signal has been abbreviated as ST and the End as E. The Start signal is a symmetrical frequency shift signal wherein the Radio Central transmitter frequency is shifted upward for a short pulse duration and then shifted an equal amount downward for a similar pulse duration. The End signal also comprises a symmetrical frequency shift signal but therein the Radio Central transmitter is first shifted downward in frequency for a short pulse duration and then shifted upward an equal amount for a similar pulse duration. Detection of the frequency shift Start and End signals will be discussed with respect to FIG. 5. In the following table, the number of code elements in the Nationwide Address and in the pseudo-address have not been fully defined; however, the Nationwide Address code has been indicated as $A_1$ through $A_n$ and the pseudo-address as $P_1$ through $P_p$. The elements of the frequency assignment codes have been designated $f_1$ through $f_f$.

| Code | Function | Message Content | Response | Description |
|---|---|---|---|---|
| $F_1$ | ISFS Initial Scan for Service. | ST 0001 E. | Full address. | Any station having a request for service signify by sending your full Nationwide Address. |
| $F_2$ | TA Try Again. | ST 0010 E. | None | Any station requesting service who has not yet received DT (dial tone) operate busy tone and ignore all future messages until after HU (hang-up). |
| $F_3$ | FSFS Final Scan for Service. | ST 0011 $P_1$–$P_p$ E. | Single | The station which has received an $F_1$ code and not an $F_3$ code, store this PA (pseudo-address), start dial tone and acknowledge. |
| $F_4$ | ISFT Initial Scan for TASI. | ST 0100 E. | First bit of PA. | Any station having a TASI request respond with first bit of your PA (arbitrary 1). |
| $F_5$ | SSFT Subsequent Scan for TASI. | ST 0101 X E. | Next bit of PA. | The *n*th bit sent was X if you sent an X, respond with $n+1$ bit, if not X ignore following $F_5$ codes and await next $F_4$. |
| $F_6$ | FSFT Final Scan for TASI. | ST 0110 $X_{p-y}$–$X_p$ $f_1$–$f_f$ E. | Single bit. | The last bit sent was X if you sent an X, and the bits following $X_{p-y}$ match the remainder of your pseudo-address set to this transmitter frequency and acknowledge, if not, wait for next $F_4$ code. |
| $F_7$ | TC Terminating Call. | ST 0111 $A_1$–$A_n$ $P_1$–$P_p$ E. | do | If you are this addresee store this pseudo-address, start ringing and acknowledge. |
| $F_8$ | RFA Receiver Frequency Assignment. | ST 1000 $P_1$–$P_p$ $f_1$–$f_f$ E. | do | Pseudo-addressee—Set receiver to this frequency and acknowledge. |
| $F_9$ | RI Ringing Induction. | ST 1001 $P_1$–$P_p$ E. | do | Pseudo-addressee—Start RI (ringing induction) tone and acknowledge. |
| $F_{10}$ | BY Busy | ST 1010 $P_1$–$P_p$ E. | do | Pseudo-addressee—Start BY (busy) tone and acknowledge. |
| $F_{11}$ | NA Not Available. | ST 1011 $P_1$–$P_p$ E. | do | Pseudo-addressee—Start NA (not available) tone and acknowledge. |
| $F_{12}$ | RS Restore Station. | ST 1100 $P_1$–$P_p$ E. | do | Pseudo-addressee—Restore station—reset all memories and acknowledge. |
| $F_{13}$ | DA Detect Answer. | ST 1101 $P_1$–$P_p$ E. | do | Pseudo-addressee—If your receiver is off hook, acknowledge. |
| $F_{14}$ | RC Release Channel. | ST 1110 $P_1$–$P_p$ E. | do | Pseudo-addressee—Disable transmitter or receiver and acknowledge. |
| $F_{15}$ | RT Restore Tones. | ST 1111 $P_1$–$P_p$ E. | do | Pseudo-addressee—Stop tones. |

*Mobile Station Radio in Detail*

The mobile radio transmitter and receiver equipment will now be described in detail with respect to FIGS. 5, 6, and 7. The radio transmitter and receiver have been generally described with respect to FIG. 4 and it should be noted that many of the elements of FIGS. 5, 6, and 7 have counterparts in FIG. 4.

Information, both data and speech from the Radio Central, reaches the mobile station via Antenna 601 which is common to both the radio receiver and transmitter. The Amplifier 603 is frequency responsive and is designed to pass only those frequencies which occur in the land transmit and mobile receive channel blocks and to reject signals at frequencies lying in the mobile transmit and land receive frequency blocks.

The Block Tune Oscillator 637 is manually or automatically set so that its frequency is approximately 45 megacycles below the center frequency of the land transmit and mobile receive frequency block which the mobile station is to receive. The Block Tune Oscillator 637 operates at several hundred megacycles. For example, if an $f_0$ radio frequency signal in the range of 900 megacycles is employed, the operating frequency of the block tune oscillator is in the order of 855 megacycles. Even though such an oscillator is crystal controlled, there is the distinct possibility that it will operate at a frequency which deviates from the desired frequency by a small amount which has been indicated as $\delta 1$ in FIG. 6. Accordingly, the operating frequency of the Block Tune Oscillator 637 has been designated $f_0-45+\delta 1$ where it is understood that $\delta$ may be a positive or negative deviation from the desired frequency.

The converter 604 is a difference converter, that is, its output signal to the high IF Amplifier 605 is the difference between the incoming signal through Amplifier 603 and the block tune oscillator output signal. Accordingly, the signal from the Converter 604 to the high IF Amplifier 605 is centered at $(45-\delta 1)$ megacycles.

The high IF signal from Amplifier 605 provides one of the two inputs to the Second Converter 606 which again is a difference converter. The second input to the Converter 606 is the output of Oscillator 608, which operates at 34.3 megacycles, and again since this oscillator may deviate slightly from its stated operating frequency there is shown therewith, in FIG. 6, an error of $\delta 2$. The Oscillator 608 has an Automatic Frequency Control input signal on the AFC conductor. The AFC signal serves to vary the frequency of the Oscillator 608 within prescribed narrow limits and derivation of the AFC signal will be described with respect to FIG. 5.

The output of the Second Converter 606 is centered at (10.7—δ1—δ2) megacycles and is fed in parallel to the Data Receiving Amplifier 502 via Conductor 501 and to the Message Low IF Amplifier 609.

*Message Channel Selection*

Channel selection in the message band is accomplished through the Channel Select Converter 610, which, like Converters 604 and 606, is a difference converter. The first input to Converter 610 is the output of the Message Amplifier 609 and the second is the output of the Converter 612. The input signals to Converter 612 will not be discussed at this time; however, it is sufficient to note that the signal on Conductor 611 is $$[10.245-\delta1-\delta2+(0.008N+0.004)]$$

megacycles. The purpose of the signal on Conductor 611 being to provide a second input to the Difference Converter 610 such that the output of Converter 610 to Amplifier 614 will lie at approximately 455 kilocycles. It should be noted that the δ1 and 2δ errors are eliminated in the process. The output from Amplifier 614 is detected in Detector 615 where speech or other message signals are recovered for transmission to the subscriber's Telephone Handset Receiver 618.

*Data Detection*

The signals on Conductor 501 comprise both the data and speech signals and these signals are amplified in Amplifier 502. As described with respect to FIG. 2, the land to mobile data channels are each 65 kc. wide and are centered 0.416 megacycle above and below the block center frequency $f_0$. The message channel signals are not required in the arrangements of FIG. 5; however, both the upper and lower data channels are processed therein.

The High Converter 504 is a difference converter and therein the high data channel, which is centered at 11.116—δ1—δ2 megacycles is combined with the 0.416 megacycle output from the Data Oscillator 506 to provide a signal, centered at 10.7—δ1—δ2 megacycles, to the High Data IF Amplifier 507.

The Low Converter 505 is a summing converter and therein the low data channel signal, which is centered at 10.284—δ1—δ2 megacycles, is combined with the 0.416 megacycle output signal from the Data Oscillator 506 to provide a signal, centered at 10.7—δ1—δ2 megacycles, to the Low Data IF Amplifier 508.

The Data Amplifiers 507 and 508 are gated amplifiers which are normally conductive and which are inhibited by signals from AND Gates 509 and 510, respectively.

Twin data channels are employed to provide redundancy of information and thereby improve system reliability. Upon simultaneous failure of receipt of both data channels, the mobile station is disabled as proper operation of the mobile station requires periodic data messages from the Radio Central. The output of the High Data Channel Gated Amplifier 507 is fed in parallel to the Detector 527 via Conductor 536 and to the OR Gate 540, while the output of the Low Data Amplifier 508 is fed in parallel to the Detector 528 via Conductor 537 and to OR Gate 540. The output of OR Gate 540 is applied to Gate 568 which is inhibited, under Control of the disable conductor until a proper data signal is received as described below.

The Detectors 527 and 528 have Output Conductors 533 and 534 which indicate the absence or presence of input signal to their respective detectors. Assuming as a starting point that there are no input signals to Detectors 527 and 528, there will be no output from OR Gate 535 and therefore there will be an output signal from the Logical Inverter 526. The output from Inverter 526 serves to reset the B Flip-Flop 518 and thereby de-energizes the "1" Output Conductor 516 from Flip-Flop 518.

De-energization of Conductor 516 disables AND Gates 509 and 510, therefore, neither of the Gated Amplifiers 507 and 508 will be inhibited initially. Also, when Flip-Flop 518 is reset, its "0" output conductor, the Disable conductor, will be energized and will thereby disable the mobile station as will be explained later.

There is a second output from each of the Detectors 527 and 528 which is fed through narrow band Filters 529 and 530, respectively. Each of these filters has its passband centered at approximately 22.4 kilocycles. The output signals from Filters 529 and 530 are connected respectively to Detectors 531 and 532. Output signals from the Detectors 531 and 532 indicate respectively the presence of high and low data signals.

Under the initial conditions priorly assumed, where Gated Amplifiers 507 and 508 are both conductive, data signals from the Radio Central will cause simultaneous energization of the output conductors from Detectors 531 and 532 to enable AND Gate 523 and thereby effect setting of the B Flip-Flop 518. Upon the setting of Flip-Flop 518, its "1" Output Conductor 516 will be energized to provide enabling signals to AND Gates 509 and 510. The second input signal to AND Gate 509 is the "1" Output Conductor 512 of the A Flip-Flop 511 and the second input to the AND Gate 510 is the "0" output conductor of the A Flip-Flop 511. Therefore, in accordance with the state Flip-Flop 511, one of the AND Gates 509 or 510 will be enabled to provide an inhibiting signal to one of the Gated Amplifiers 507 or 508.

The A Flip-Flop 511 serves to switch operation between the high and low data channel upon failure of data on the channel in use so long as there is data available on the other channel. Assuming that the A Flip-Flop 511 is in the "1" state upon the initial simultaneous receipt of the twin data carriers, the AND Gate 509 will be energized and thereby inhibit the Gated Amplifier 507. Under these conditions, the low data channel will be employed.

So long as data is present on one or the other of the high or low data channels, OR Gate 535 will remain enabled and the B Flip-Flop 518 will remain in its set state. If the data channel in use, in the example the low data channel, falls below a usable signal level, the output from Detector 532 will fail and the Logical Inverter 522 will provide an output pulse on Conductor 515 to reset the A Flip-Flop 511. When Flip-Flop 511 is in the reset state, AND Gate 510 will be enabled and AND Gate 509 will be disabled, thereby inhibiting Amplifier 508 and enabling Amplifier 507. The unfiltered output signals from Detectors 527 and 528 are connected through OR Gate 535 to the data conductor for use throughout the mobile station as will be later described.

The undetected 10.7—δ1—δ2 megacycle signals from the outputs of Amplifiers 507 and 508 are connected through OR Gate 540 and the Inhibit Gate 568 to the Discriminator 541 and the Filter 542 in parallel. The output from Filter 542 is employed to maintain the Synchronized Oscillator 544 at the desired frequency of 10.7—δ1—δ2 megacycles. The output signal of the Oscillator 544 occurs on Conductor 546 and is employed in the mobile transmitter and receiver as will be later described.

*AFC Control*

The Discriminator 541 has its response curve centered at 10.7 megacycles and provides both AFC signals and data signals to the Start and End detector circuits. The AFC signal from the output of Discriminator 541 is filtered in 543 to remove rapid variations in frequency and provides an AFC signal for use in the mobile transmitter and receiver.

*Start and End Signal Detector*

The Start and End signals transmitted from the Radio Central both comprise symmetrical frequency shift signals. The Start signal comprises a positive frequency shift for a fixed pulse duration followed by a negative frequency shift of equal magnitude for a similar pulse duration and the End signal comprises an initial negative frequency shift for a first pulse duration immediately followed by a positive frequency shift of similar pulse duration. The Start-End Flip-Flop 558 is in the set or reset state in accordance with the nature of the last received frequency shift signal. Upon receipt of a Start signal, the initial positive output pulse from Discriminator 541 over Conductor 545 will enable the Threshold Responsive Circuit 548 and thereby provide a pulse to the Delay Means 549. The initial positive pulse from Discriminator 541 will also tend to enable AND Gate 555 but will appear as a "0" or absence of signal at the output terminals of Logical Inverters 551 and 552.

The immediately succeeding negative pulse from Discriminator 541 causes Logical Inverter 551 and 552 to provide output signals to the AND Gate 550 and the Positive Threshold Circuit 553, respectively. The delay in Delay Means 549 is proportioned so that the signal at the output of the Positive Threshold Circuit 548 which was occasioned by the initial positive pulse of the start signal reaches the AND Gate 550 coincident with the above-noted output signal from the Logical Inverter 551. Therefore, AND Gate 550 is energized upon the occurrence of a Start signal, and Flip-Flop 558 is thereby set. There are two Start signals derived as described above. The first Start signal labeled ST′ is the transient output signal from AND Gate 550 and the other is a D.-C. signal labeled ST, which is derived from the "1" output conductor of Flip-Flop 558.

The initial negative pulse of an End signal causes a positive output from Logical Inverter 552, which in turn enables the Positive Threshold Circuit 553 to provide a pulse to the Delay Means 554. The immediately succeeding positive pulse combines with the output of Delay Means 554 to enable AND Gate 555 and thereby reset the Start-End Flip-Flop 558. As in the case of the Start signals, there are similarly two End signals, namely, E and E′. The E signal is the D.-C. state of the "0" output conductor of Flip-Flop 558 and the E′ is a transient output signal which occurs upon enablement of AND Gate 555.

The ST, ST′, E, and E′ leads are shown entering the Timing and Control Cable 566. The Timing and Control Cable 566 is employed in the drawing for ease of understanding as direct interconnection of all the elements within the system requiring administrative and timing signals would unduly complicate and obscure an understanding of the invention.

*Mobile Transmitter*

As described with respect to FIG. 2, the mobile station transmits data on twin data carriers located ±0.444 megacycles from $(f_0-17.664)$ megacycles, which is the center of the mobile transmit frequency block.

Several conversions are employed in the mobile transmitter to generate the transmitting signal and the conversion scheme is chosen to minimize errors in the setting of the oscillators in the mobile station. The Oscillators 661 and 660 operate at 1600 kc. and 2488 kc., respectively, or at a spacing of 888 kc. which is the spacing of the mobile transmit data channels. Since straight conversion without multiplication is employed in the mobile transmitter, the two data channels will retain this frequency spacing. The output signals from Oscillators 660 and 661 are combined in Combiner 659 and are then transmitted to Gated Amplifier 656. As will be seen later, AND Gate 651 is enabled whenever data is to be transmitted from a mobile station, thereby energizing Conductor 657 to enable Amplifier 656. The output signal from Amplifier 656, comprising the complex signal including the 1600 and 2488 kc. signals is one of the inputs to the Difference Converter 643. The second input to the Converter 643 is the $10.7-\delta1-\delta2$ megacycle signal on Conductor 546 from the Synchronized Oscillator 544 shown in FIG. 5. Under the above conditions, where Gated Amplifier 656 is enabled, the output signal from Converter 643 will comprise two signals, namely, the low data channel signal at $8.212-\delta1-\delta2$ megacycles and the upper data channel signal at $9.1-\delta1-\delta2$ megacycles. The signal generated by the 1600 kilocycle Oscillator 661 is considered to be the high data channel and the signal generated by the 2488 kilocycle Oscillator 660, the low channel. The output signals from Converter 643 are transmitted to Amplifier 641 and Gated Amplifier 642 in parallel. Amplifier 642 is enabled when a message is being received, and, under transmitting conditions, it is disabled.

The twin data carriers from the output of Amplifier 641 comprise one of the two inputs to the Summing Converter 639. The second input to Converter 639 is the output of the Stabilized Oscillator 608 and is a signal at $(34.3+\delta2)$ megacycles. Accordingly, the output of the Summing Converter 639 comprises two signals, the first at $42.512-\delta1$ megacycles and the other at $43.400-\delta1$ megacycles.

The data respond signal from AND Gate 651, which was employed to enable Amplifier 656, also comprises one of the three inputs to OR Gate 650, therefore, whenever Amplifier 656 is enabled, Speech Detector 646 will similarly be enabled to provide an enabling signal to Amplifier 647 on Conductor 669. The Speech Detector 646 is responsive to information signals from the data source, from the Tone Source 684, and from the Message Transmitter 619. The speech detector remains energized so long as a speech tone or data burst continues, and therefore, because of its inherent low frequency response, remains operated between data pulses of a single message. The pulse data message is transmitted through Audio Amplifier 649 to the Speech Modulator 648 where it is combined with the 15.620 megacycle signal from the Oscillator 671.

The output from the Modulator 648 comprises one of the two input signals to the Difference Converter 640, the other input signal to 640 being the output signals from Converter 639 at 42.512 megacycles and 43.400 megacycles. The output signal from Converter 640 comprises two signals at 26.892 and 27.780 megacycles. These signals are combined with the output of the Block Tune Oscillator 637 to provide radio frequency signals centered about $(f_0-17.664\pm0.444)$ megacycles.

It should now be noted that the output signal from the Receiving Converter 606 includes the δ1 and δ2 error signals associated with the Block Tune Oscillator 637 and the Frequency Control Oscillator 608. Accordingly, the output signal from the Synchronized Oscillator 544 includes these error signals. Mixing the signal derived from the $10.7-\delta1-\delta2$ megacycle signal with the $34.3+\delta2$ megacycle signal in the Summing Converter 639 eliminates the δ2 error in the transmitted signal and mixing the signal derived from the $10.7-\delta1$ megacycle signal in the Summing Converter 672 with the output of the Block Tune Oscillator 637 eliminates the δ1 error from the transmitted signal.

The radio frequency power Transmitting Amplifier 602 is under control of the Transmit Enable Conductor 692, which is the output of AND Gate 691. The AND Gate 691 is disabled whenever the disable conductor is energized. Gate 691, in the absence of a disable signal, is energized by a signal on the $F_6''$ conductor or upon the energization of the data respond conductor.

*Channel Selection*

Although 110 mobile transmit and 96 land transmit message channels are provided, each mobile station has access to only a segment of these channels. In the example shown in the drawing, each mobile station has access to 16 message channels. The particular 16 channels to which the mobile station has access are determined by the operating frequency of the Oscillator 702. The channels to which a mobile station has access are not immediately adjacent channels but rather are channels spaced several kilocycles apart throughout the block. The particular channels to which a mobile station has access are indicated by a portion of the Nationwide Address which is assigned the mobile.

The channel selection is accomplished by the setting of binary coded information into the Frequency Assignment Register 731. The output conductors of the first two stages are connected via Conductors 732 and 733 to the Channel Select A Translator 709 and the output conductors of stages 3 and 4 are connected via Conductors 734 and 735 to the Channel Select B Translator 721. In accordance with the input signals to the A Translator 709, one of the four AND Gates 705–708 will be enabled and in accordance with the input signals to B Translator 721, one of the four AND Gates 714–717 will be energized. The AND Gates 705–708 are arranged to tap the Coil 718 so that the circuit comprising Capacitor 712 and the tapped portion of the Coil 718 will resonate at the noted harmonic frequencies of the 56 kilocycle Square Wave Source 701. For example, when AND Gate 705 is enabled, the circuit will resonate at 224 kc. and when AND Gate 708 is enabled, the circuit will resonate at 392 kc.

Similarly, AND Gates 714–717 serve to tap the Coil 719 and thereby permit operation of the tuned circuit comprising Capacitor 713 and the Tapped Coil 719 portion to resonate at the harmonic frequencies of the 224 kc. Square Wave Source 720.

A first summing conversion is accomplished in the Converter 703 where the output of the Oscillator 702 provides one input signal and the output from the resonant circuit comprising Capacitor 712 and Tapped Coil 718 comprises the other input signal. The output of Converter 703 is filtered in Filter 704 to eliminate undesired conversion products and the output of Filter 704 is combined in the Summing Converter 710 with the output signals from the resonant circuit comprising Capacitor 713 and Tapped Coil 719.

The output signal from Converter 710 on Conductor 655 selectively comprises one of the voice channel select signals lying between 1608 kilocycles and 2480 kilocycles. The channel select signal is filtered in Filter 654 to eliminate unwanted conversion products and as required is gated through Amplifier 652 for transmission to the Difference Converter 643. From this point, the transmission of voice signals proceeds as did the previously described transmission of data signals.

*Clock Pulse Source*

Three types of clock pulses are used throughout the mobile control logic. These clock pulses are derived from the 224 kc. Square Wave Generator 720 and phasing of the clock pulses is established by means of the Start' pulse on lead ST'. The clock pulses are identified as C1, C2, and C/8 pulses.

The C1 clock pulse is derived from the 224 kc. Square Wave Generator 720 output by means of the 10 to 1 Divider Circuit 736, which is reset upon the occurrence of each ST' pulse. The Square Wave Generator 720 is crystal-controlled and is of relatively stable operation. The use of a divider circuit such as 736, which is reset at regular intervals, assures a stable C1 clock pulse supply which is always set in phase within very accurate limits. The nature of the C1 clock pulse signals is shown at line 3 of FIGS. 15 through 22.

The C2 clock pulses are of slightly longer duration than than the C1 clock pulses and are displaced in time by one-fourth of a bit interval. The C2 clock pulses are derived from the C1 clock pulse source by means of the δ/4 Delay Circuit 770 and the Pulse Stretcher 771. The nature of the C2 clock pulses is shown in the timing diagram of FIG. 16 at line 5.

The third or C/8 clock pulse is employed in timing the transmission of data messages from a mobile station to Radio Central. The C/8 pulses occur at one-eighth the rate of the C1 pulses and originate a quarter bit after the C1 clock pulse. The C/8 pulses are derived by means of the δ/4 Delay Circuit 775, the AND Gate 745, and the 8 to 1 Divider Circuit 714. The nature of the C/8 pulses is shown in the timing diagram of FIG. 15 at line 6.

*Mobile Control Logic*

The operation of the arrangements of FIGS. 8–11 can best be understood with respect to a discussion of the Radio Central to mobile data messages.

Figure 5:
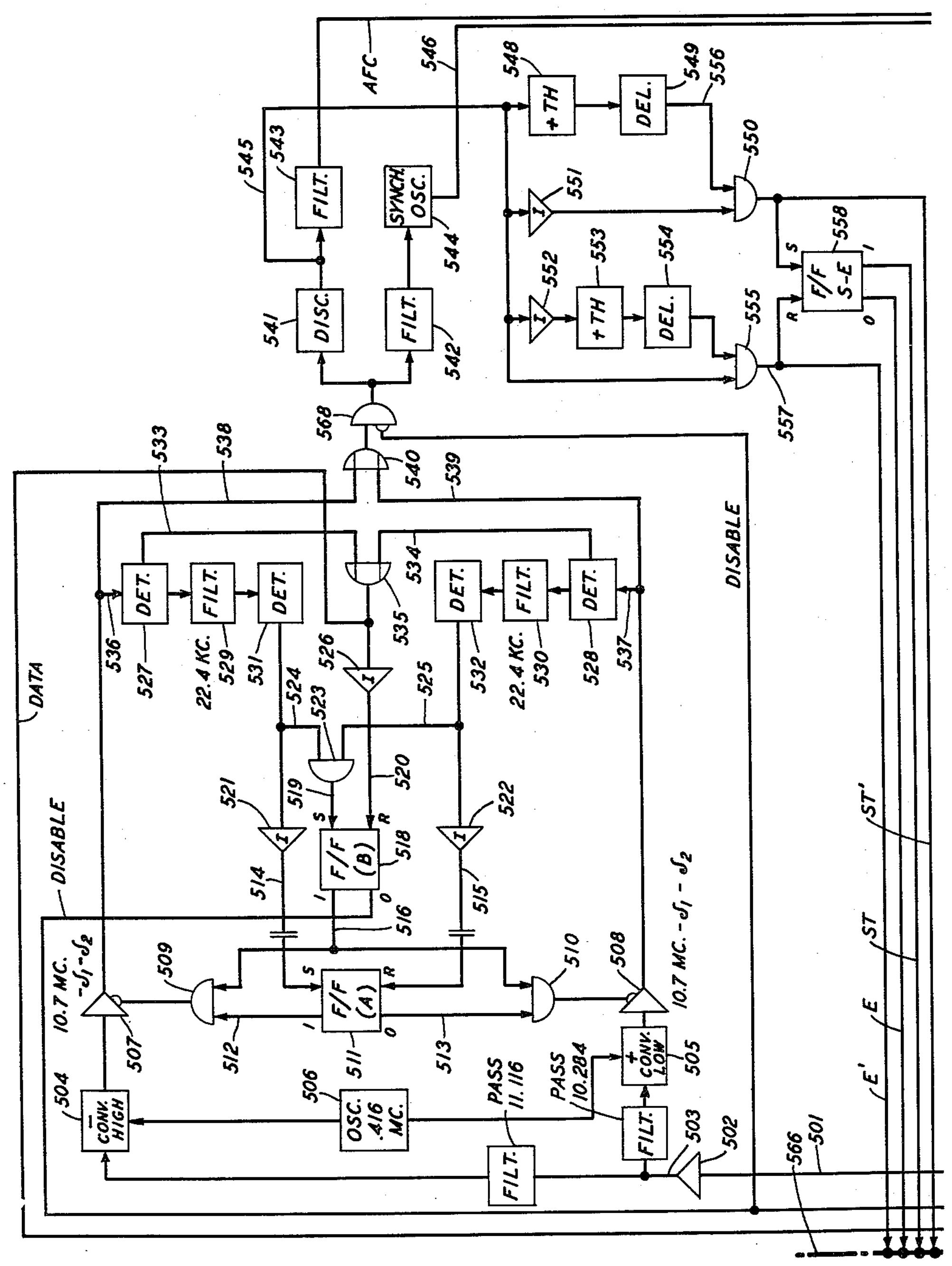
FIG. 5 is a schematic representation of data receiver and AFC circuitry.

As discussed with respect to FIG. 5, data signals appear at the output of OR Gate 534 on the conductor designated "DATA." The data signals are transmitted through AND Gate 725 so long as the "Disable" conductor or the $F_2'$ conductor are not energized. The output from AND Gate 725 on the DATA' lead is selectively gated to the Frequency Assignment Register 731 through AND Gate 724, to the Function Receive Shift Register 801 through AND Gate 802, to the Pseudo-Address Register 1126 through AND Gate 1123, and is also applied to the Match Circuit 1152.

Upon the occurrence of a Start signal at the beginning of any of the previously-noted function messages, the ST' conductor will be energized to set the first stage of the Shift Register 801 and reset the remaining stages 2–5. The "1" thus set in the first stage will hereinafter be referred to as the initial "1." Immediately succeeding the ST' signal, C1 clock pulses, derived as explained with respect to FIG. 7, will appear at the input to AND Gate 803 in step with, but displaced in phase, from the data signals on lead DATA' at the input to AND Gate 802. The first clock pulse immediately precedes the first data element and thereby advances the initial "1," from stage 1 to stage 2. Immediately thereafter, the first data element appears and stage 1 is set or reset in accordance with this element. That is, if the first data element is a "1," stage 1 will be set, and if it is "0," stage 1 will remain reset.

In the table of function codes, it is seen that each function code comprises four binary bits. It is in the Shift Register 801 that the function codes are stored and in the Translator 830 that they are processed to selectively energize the desired logic elements in the mobile receiver. The first four stages of the Shift Register 801 are connected through AND Gates 806–813 to the Translator 830 which is a four bit binary to 1 out of 16 translator. The first four bits of the message immediately succeeding the message start signal are stored in the first four stages of the Shift Register 801 when the initial "1" reaches the fifth stage. Upon setting of stage 5, the stage 5 "1" Output Conductor 831 will be energized. After being delayed one-quarter bit period in Delay Circuit 804, the output signal from stage 5 will appear as an enabling signal to AND Gate 805 and as an inhibiting signal to AND Gates 802 and 803. With AND Gates 802 and 803 inhibited, subsequent data will not affect the setting of the stages of the Shift Register 801 and similarly to C1 clock pulses will be removed from the shift register advance terminal. Further, so long as stage 5 remains in the set state and the Start-End Flip-Flop 558 remains set, the AND Gate 805 will be enabled to provide enabling signals to AND Gates 806–813. Thereby, the function code stored in stages 1–4 of the Shift Register 801 will appear as an input signal to the Translator 830. The Output Conductors $F_1$–$F_{15}$ are employed throughout the mobile station control logic circuitry to perform tasks in accordance with the function code. Detailed operation with respect to each of the function codes $F_1$–$F_{15}$ will now be described.

*$F_1$ (ISFS)—Initial Scan for Service—(ST 0001 E)*

Figure 15:
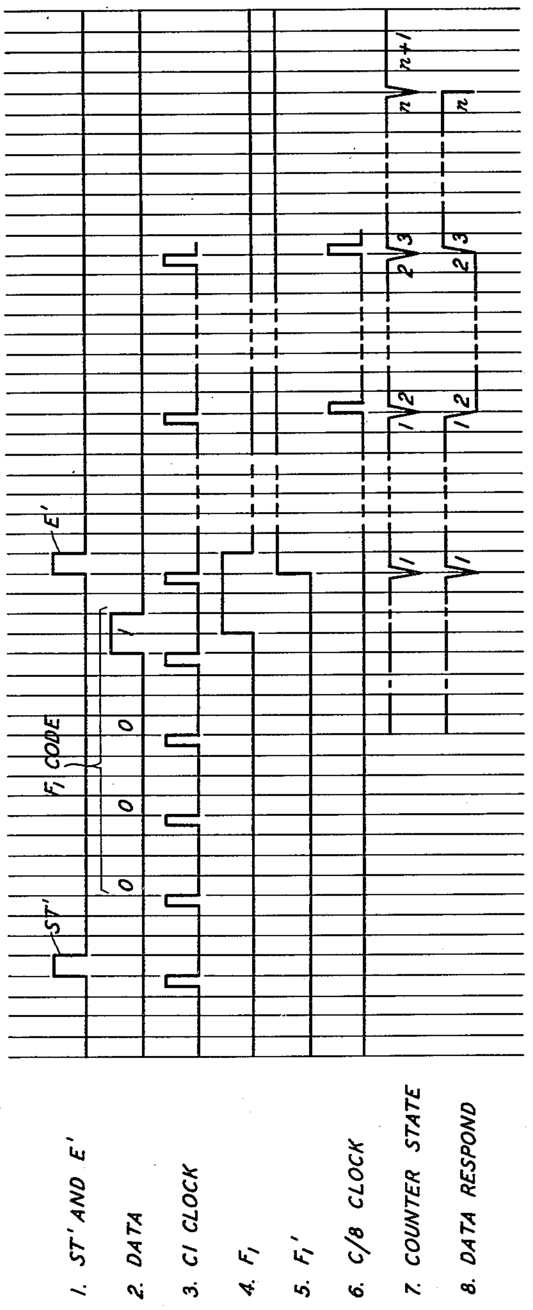
Figure 16:
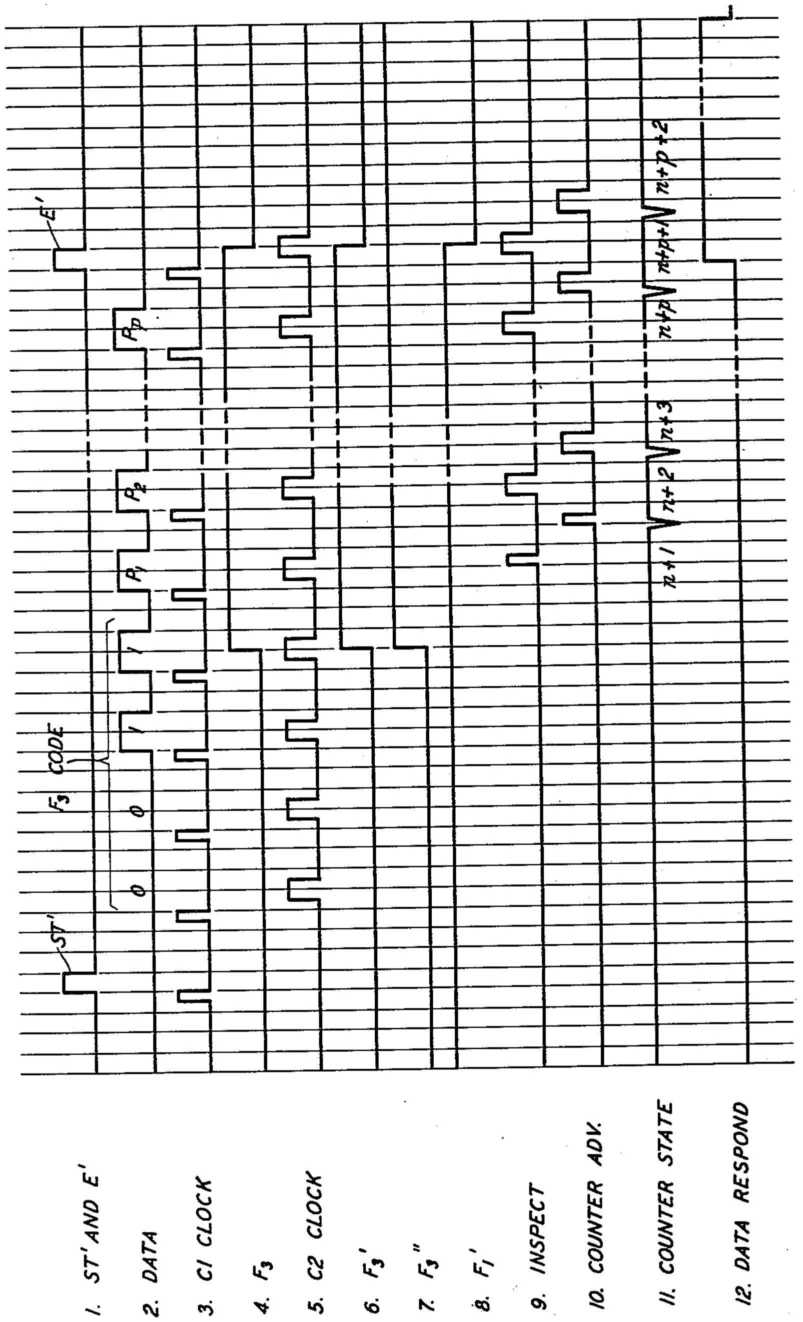

The $F_1$ or Initial Scan for Service code is a request by the Radio Central to any mobile station within range of its radio transmitter to signify a request for service by sending from the mobile station the full Nationwide Address assigned to that station. The timing of operations within the mobile control logic for an $F_1$ code is shown in the timing diagram of FIG. 15. In FIG. 15, the Start' and End' signals are shown in line 1 as occurring just preceding the first data pulse position and just succeeding the last data pulse position, respectively. The data signal is shown in line 2 of FIG. 15 and as indicated in the table of function codes, the $F_1$ code is 0001.

As previously described, the Start' signal on lead ST' resets the 10 to 1 Divider 736, and thereby re-phases the C1 clock pulses which are shown as occurring just preceding each of the data bit positions shown in line 2 of FIG. 15.

Upon receipt of an $F_1$ code, a translation in Translator 830 is accomplished as previously described and the $F_1$ conductor is energized. A request for service is indicated in a mobile station when the mobile station is in the off-hook condition and not previously served by the Radio Central. The Request for Service Flip-Flop 820 is set upon energization of the $F_1$ conductor if the mobile station is requesting service. In line 4 of FIG. 15, the $F_1$ conductor is shown as becoming energized during the fourth data bit period and the $F_1'$ conductor, which is the "1" output terminal of the Request for Service Flip-Flop 820 is energized upon the occurrence of the End' signal on Conductor E' and this is shown in line 5 of FIG. 15. The Flip-Flop 820 is set upon the enablement of AND Gate 817, which has three enabling and one inhibiting input conductors. The enabling conductors to AND Gate 817 comprise the $F_1$ conductor, the "Off-Hook" conductor, and the End' conductor. The $F_3''$ conductor is the inhibiting conductor to AND Gate 817 and as will be seen later with respect to the $F_3$ code, the $F_3''$ conductor is energized whenever the mobile station is being served by Radio Central.

Energization of the $F_1'$ conductor originates the process in the mobile station whereby the full Nationwide Address of the mobile staiton requesting service is transmitted to the Radio Central via the mobile to Radio Central twin data channels. The Nationwide Address is transmitted to Radio Central by the arrangements shown in FIG. 11. The Shift Register 1101 is employed as a variable counter or commutating switch and the "1" output conductor of stages 1 through $n$ of Counter 1101 is connected to the 1 through $n$ input terminals on the Own Number Plug 1102.

The purpose of the own number plug is to code the mobile station control logic in accordance with its Nationwide Address. Links are provided between similarly numbered input and output terminals of the Own Number Plug 1102 in accordance with the Nationwide Address assigned to the mobile station. For example, if the first bit of the Nationwide Address is a "1," a link is provided between the first input and the first output terminals of the own number plug. Similarly, links are provided or omitted in the input and output terminal bars 2 through $n$ in accordance with the remaining bits of the Nationwide Address.

The own number plug thereby selectively connects the "1" output terminals of the stages 1 through $n$ of Counter 1101 to the Conductor 1106.

Enablement of the $F_1'$ conductor sets the first stage of the Counter 1101 and resets all of the remaining stages. The $F_1'$ conductor is one of the inputs to the OR Gate 1104 and thereby sets stage 1 of Counter 1101 and resets stage $n+1$. The $F_1'$ conductor is also one of the inputs to the OR Gate 1105 and thereby resets all of the remaining stages of Counter 1101.

Upon setting of stage 1 of Counter 1101, the "1" output conductor of stage 1 is enabled and a signal is transmitted to the "1" input conductor of the Own Number Plug 1102. If the first bit of the mobile Nationwide Address is a "1," a link between the "1" input and "1" output terminal of the Plug 1102 will provide a connection between the "1" terminal of the first stage of Counter 1101 and the Conductor 1106. The initial "1" which was entered in stage 1 of Counter 1101 is advanced through the counter under control of the signals on the Advance Conductor 1107. In the case of the $F_1$ code, the advance pulses are provided through AND Gate 1108, which is energized upon the simultaneous occurrence of an $F_1'$ signal and a C/8 clock signal. As previously described with respect to FIG. 7, the C/8 clock pulses occur at one-eighth the repetition rate of the C1 and C2 clock pulses and are initiated upon the occurrence of an $F_1'$ signal. Advancing the initial "1" through the Counter 1101 provides signals to the Conductor 1106 in accordance with the coding of the Own Number Plug 1102. The C/8 pulse is employed at this point as the data is transmitted from the mobile station to Radio Central at one-eighth the speed of transmission from Radio Central to the mobile station. That is, while transmission from Radio Central to mobile stations is at a data rate of approximately 22.4 kc., the data rate from the mobile station to Radio Central is at one-eighth this rate or approximately 2.8 kc.

As shown at line 8 of FIG. 15, the Nationwide Address is transmitted to Radio Central in a Non-Return-to-Zero code; that is, a code wherein a "1" code element persists for a full bit period duration. At line 8 the first element of the Nationwide Address is shown as a "1," the second element as a "0," the third and $n$th elements as "1's."

Advance pulses persist so long as AND Gate 1108 is enabled. If the mobile station is previously served as indicated by energization of the $F_3'$ conductor, OR Gate 1109 will be enabled and AND Gate 1108 will be inhibited. Further, when the initial "1" reaches the $n+1$ stage of Counter 1101, the OR Gate 1109 will be enabled to also inhibit AND Gate 1108 and thereby halt advance pulses at the output of AND Gate 1108. The full Nationwide Address has been transmitted from the mobile station to Radio Central when the initial "1" reaches the $n+1$ stage of Counter 1101.

The signals on Conductor 1106 are transmitted through AND Gate 1114, OR Gate 1115, and AND Gate 1116 to the "Data Respond" conductor.

The AND Gate 1114 has two enabling conductors, namely, the Conductor 1106 which carries the Nationwide Address from the output of the Own Number Plug 1102 and the $F_1'$ conductor. Enablement of AND Gate 1114 enables OR Gate 1115, which in turn enables AND Gate 1116 if the inhibiting $F_2''$ conductor is not energized. As will be seen later, the $F_2$ function code is a Try-Again signal which indicates that the mobile stations receiving this signal should hang up and try again to initiate a call.

Figure 6:
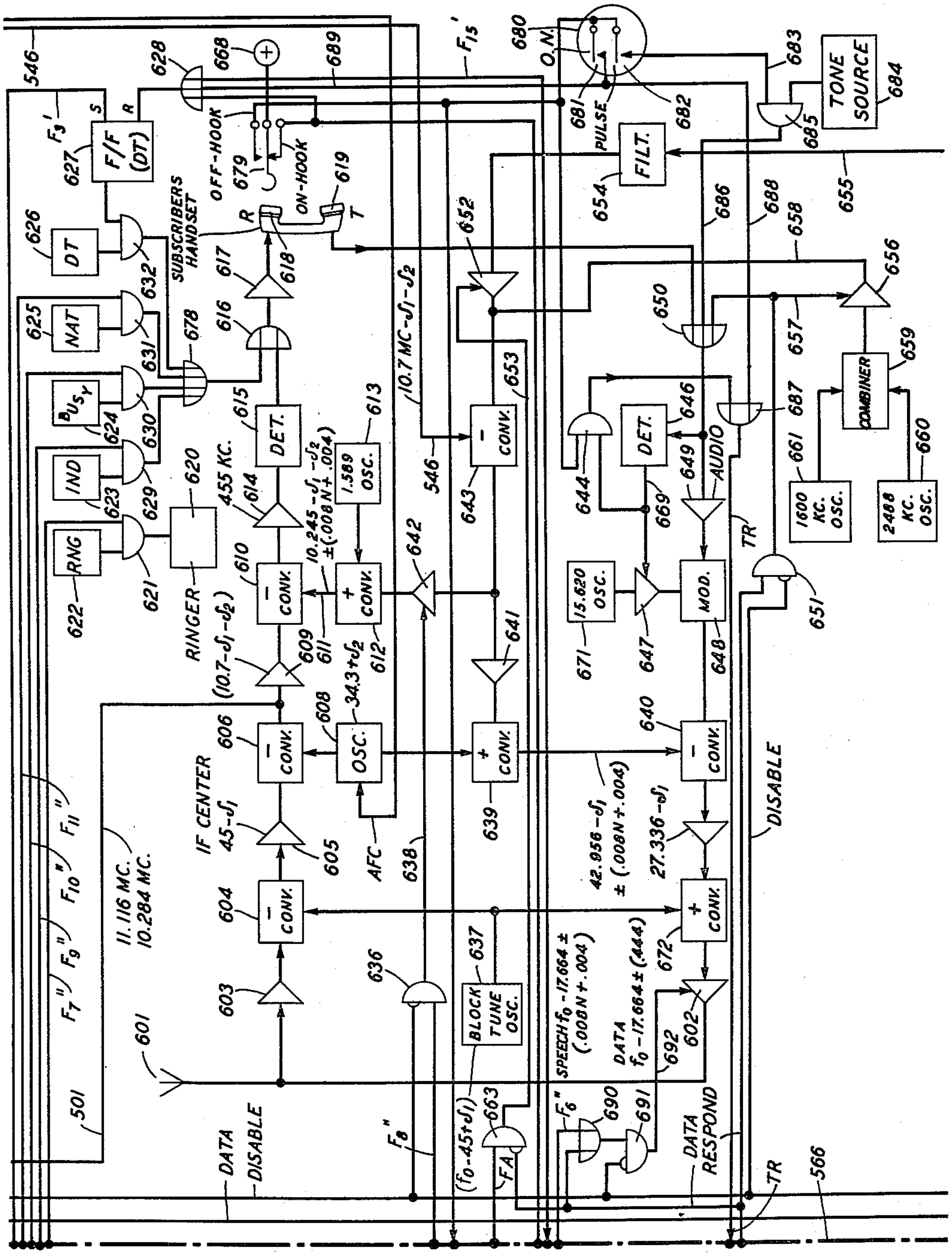
FIG. 6 is a schematic representation of the message channel intermediate frequency circuitry, the message and data channel transmitter equipment, and portions of the mobile control circuitry.
Figure 7:
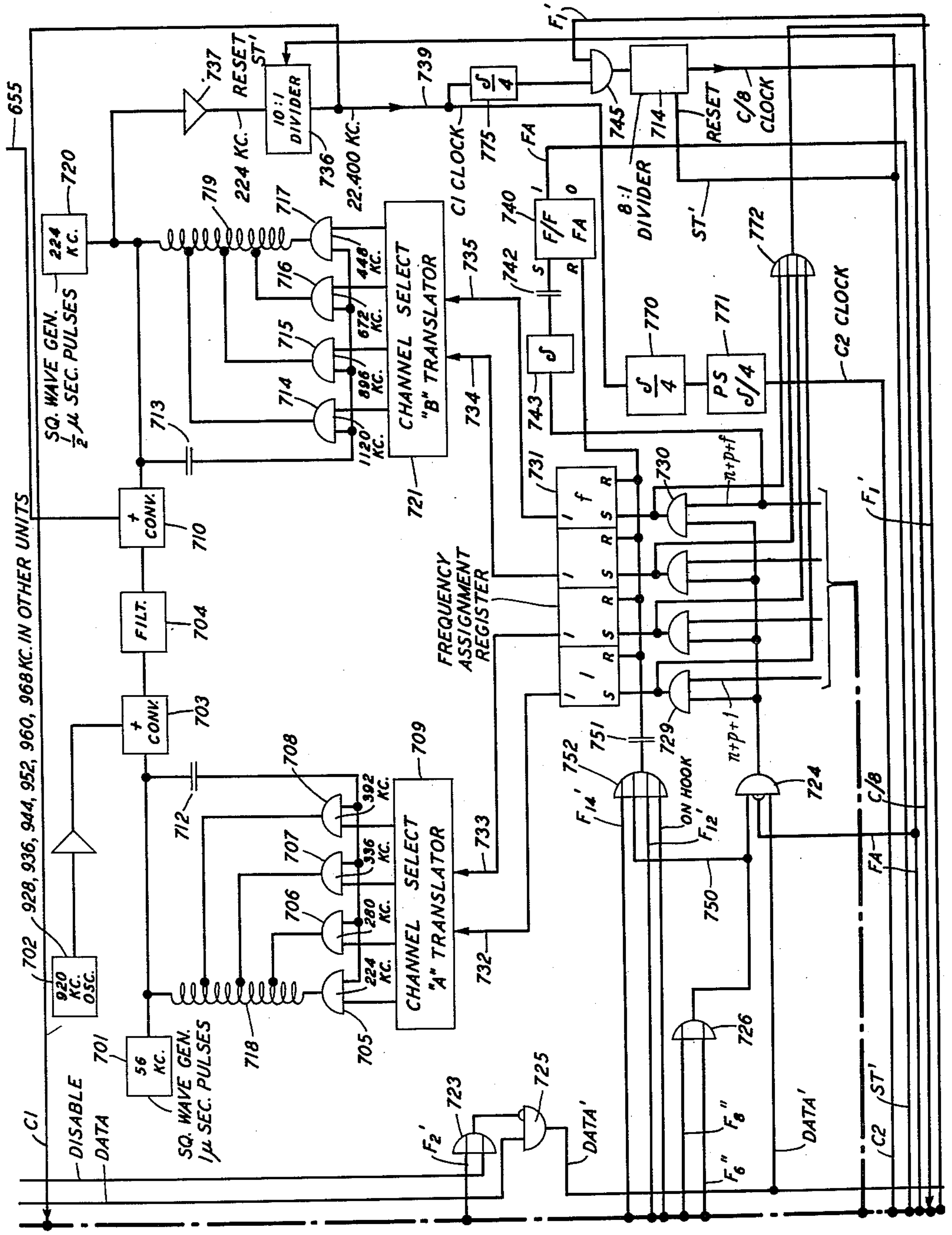
FIG. 7 is a schematic representation of the channel selecting oscillator circuits and attendant control logic.
Figure 8:
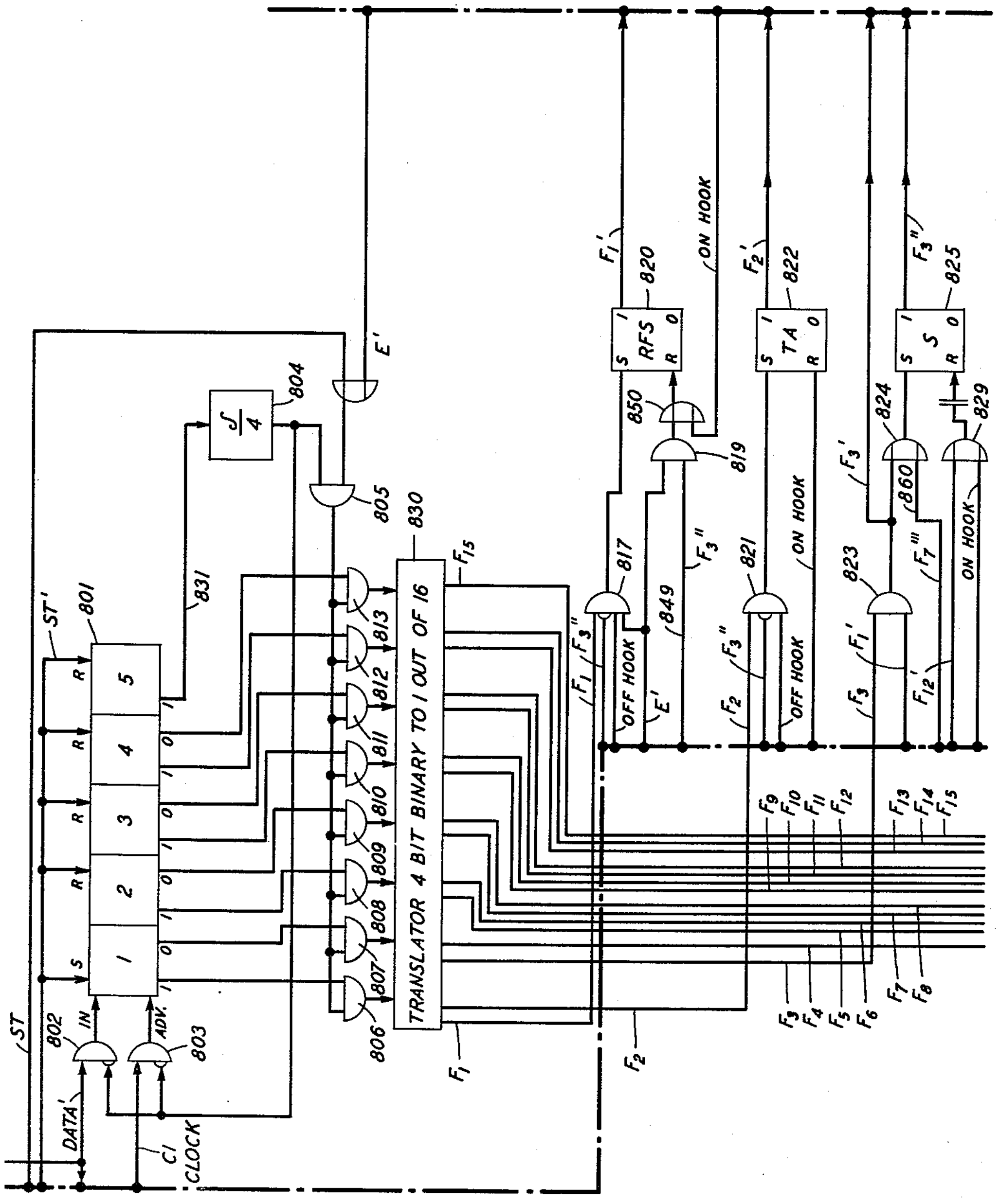
Figure 9:
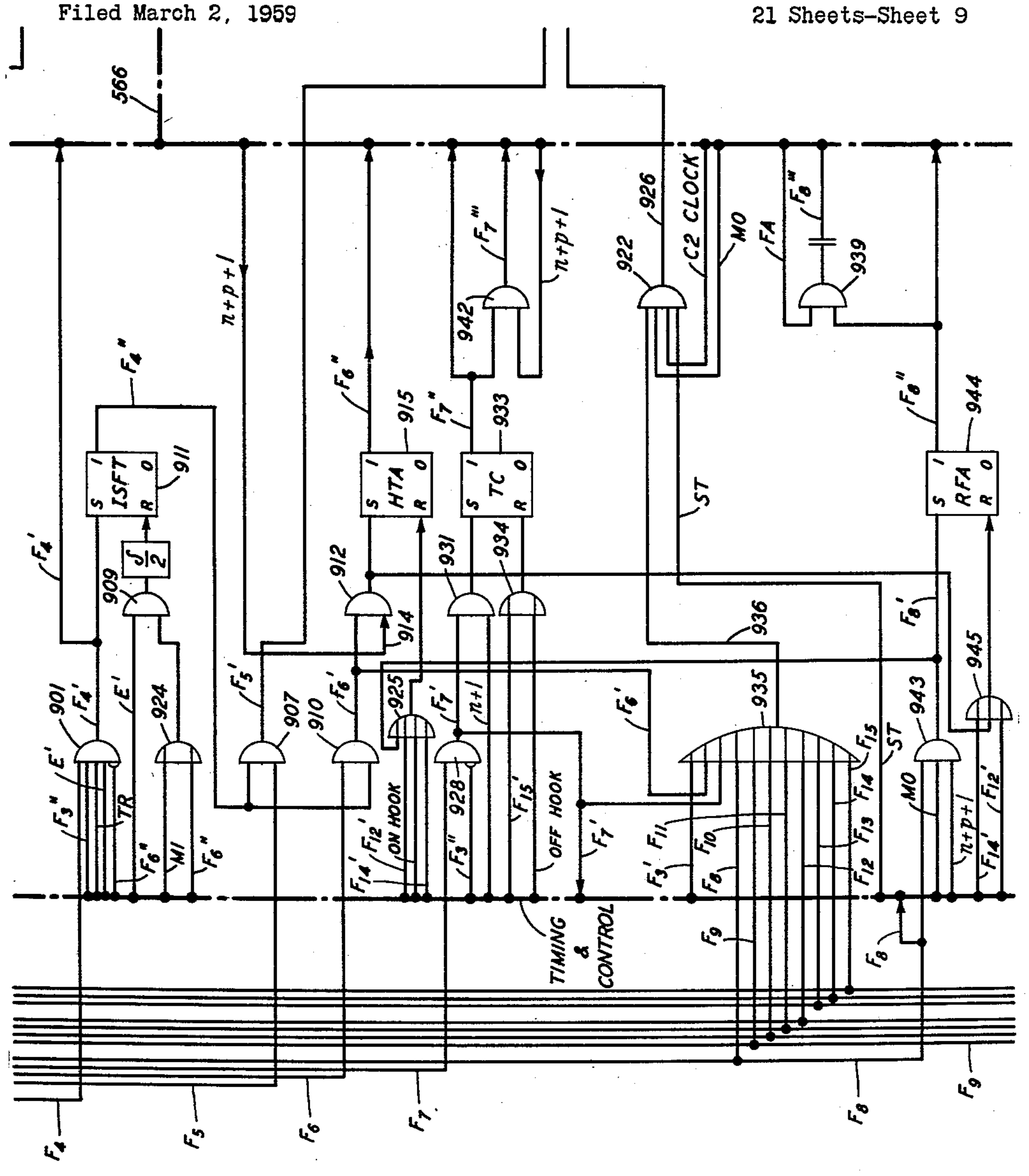
Figure 11:
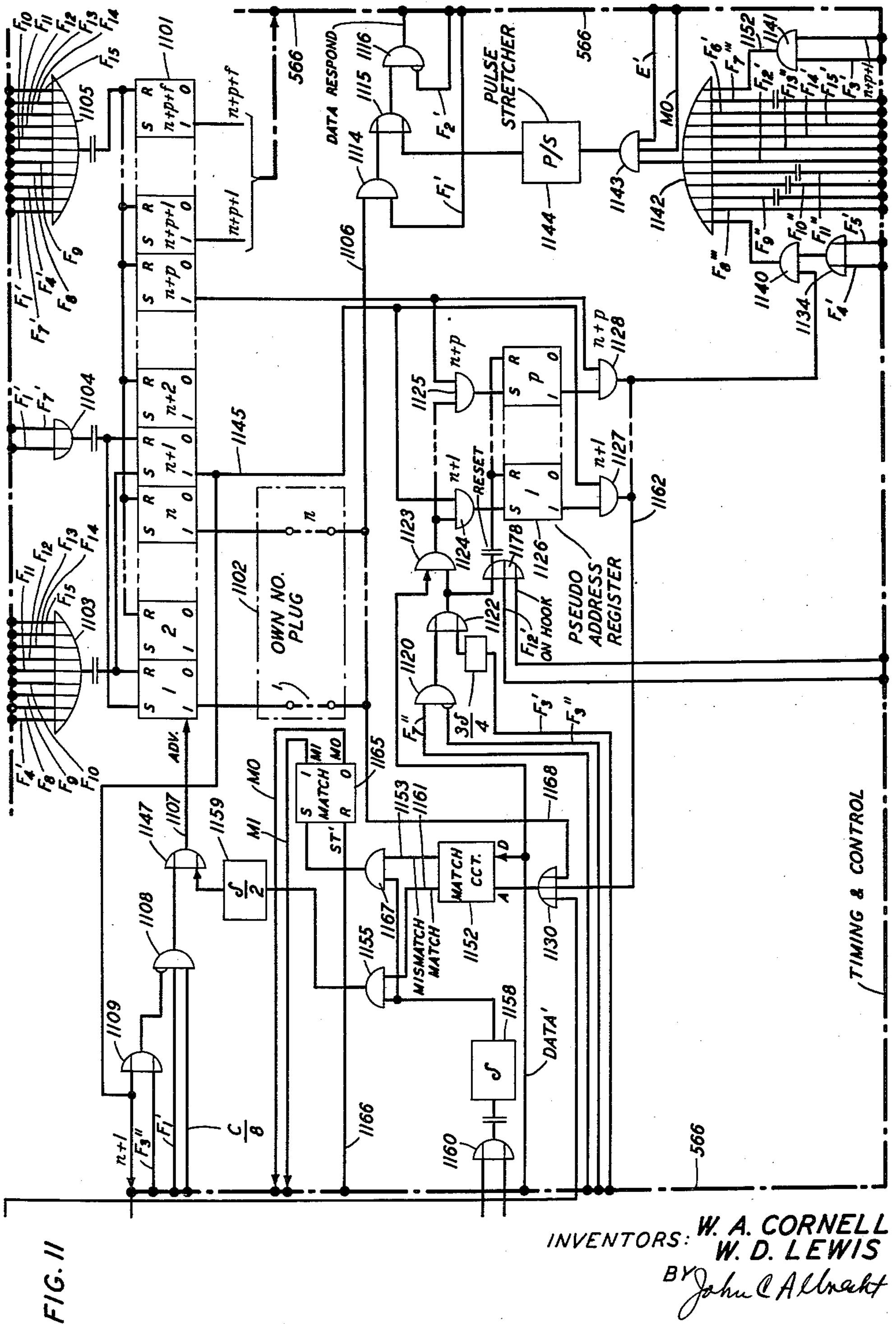

The "Data Respond" conductor at the output of AND Gate 1116 is shown entering the Timing and Control Cable 566 of FIG. 11 and emerges from the timing and control cable at the left side of FIG. 6. The data respond conductor is connected in parallel to the input of OR Gate 690, to the input of AND Gate 651, and to the inhibit input of AND Gate 663. As previously described, enablement of AND Gate 651 enables Gated Amplifier 656 and OR Gate 650, which in turn energizes Speech Detector 646 to initiate a data response to Radio Central. Enablement of OR Gate 690 under control of the "Data Respond" conductor enables AND Gate 691 so long as the "Disable" conductor is not energized, and thereby enables the Gated Output Power Amplifier 602. Application of the signal on the "Data Respond" conductor to AND Gate 663 prevents Amplifier 652 from being enabled by the FA conductor. The information comprising the mobile subscriber Nationwide Address is thereby transmitted through Modulator 648, Converters 640 and 672, Power Amplifier 602, and Antenna 601 to Radio Central.

As shown at lines 7 and 8 of FIG. 15, the initial "1" is shifted through the stages 1 through $n+1$ of the counter and the data respond conductor is energized in accordance with the coding of the Own Number Plug 1102.

*$F_2$ (TA)—Try Again—(ST 0010 E)*

The $F_2$ code indicates that any mobile station requesting service which has not yet received dial tone shall initiate a busy tone signal within the mobile station and ignore all further data messages until after the subscriber has hung up.

The $F_1$ scans occur with sufficient frequency to statistically avoid attempts by two or more subscribers to simultaneously request service; that is, it is assumed that one and only one subscriber will respond to a particular $F_1$ signal. If more than one subscriber attempts to respond, the return address messages of the subscribers requesting service will interfere with each other and will arrive as a garbled message at Radio Central. In such cases, Radio Central orders all such subscribers to hang up and try again to initiate a call. Even in areas where Radio Central serves a large number of mobile subscribers, double seizures will statistically occur a relatively few number of times and therefore do not present a problem.

The operation of the mobile receiver in the receipt of data messages proceeds as described with respect to the $F_1$ code up to the point at which information is gated from the Receiving Shift Register 801 to the Translator 830. Accordingly, it will be assumed in this description of the $F_2$ code and in the descriptions of the $F_3$ through $F_{15}$ codes that the data message has been entered in the Shift Register 801; gated to the Translator 830; and has energized the appropriate one of the output leads $F_1$ through $F_{15}$.

Upon energization of the $F_2$ conductor, the AND Gate 821 will be enabled if the mobile station is not served and if the receiver is in the off-hook condition. If the mobile station is presently served, the $F_3''$ conductor will be energized and AND Gate 821 will be inhibited. Upon enablement of AND Gate 821, the Try Again Flip-Flop 822 will be set to its "1" state to energize the $F_2'$ conductor and thereby will (1) inhibit the Data Inhibit Respond AND Gate 1116; and (2) enable the OR Gate 1005 to set the Busy Flip-Flop 1006 to its "1" state and thereby energize the $F_{10}''$ conductor.

When energized, the $F_{10}''$ conductor enables the Busy AND Gate 630 to connect busy tone from Tone Source 624 to the mobile receiver through OR Gates 678 and 616 and Amplifier 617.

Figure 10:
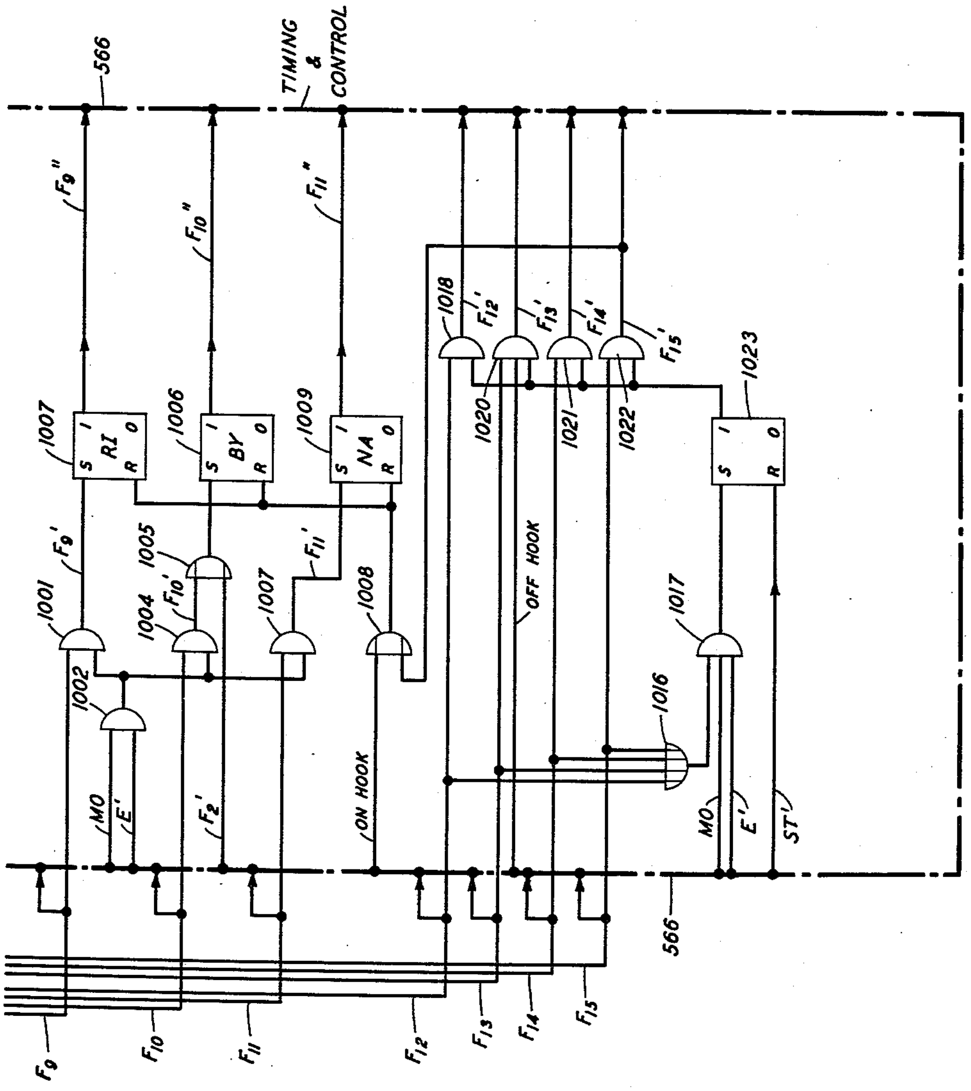

The busy tone will persist as long as the Busy Flip-Flop 1006 remains in its set state. As seen in FIG. 10, the Busy Flip-Flop 1006 is reset when the Switch-hook 679 is in the on-hook condition applying a signal to the "On-Hook" conductor or upon the receipt of an $F_{15}$ code which applies a signal to Conductor $F_{15}'$. Either signal will operate OR Gate 1008 and reset Busy Flip-Flop 1006.

*$F_3$ (FSFS)—Final Scan for Service—(ST 0011 $P_1$–$P_p$ E)*

Assuming that only one mobile station has responded to a particular $F_1$ code, there will be at any one time only one subscriber within range of the Radio Central who has responded to an $F_1$ signal and is not served by Radio Central. The $F_3$ code says "Station 1 responded to the immediately preceding $F_1$ code and is not now served by Radio Central, store the psuedo-address contained in this message for future use, acknowledge receipt of this message and initiate dial tone in your mobile station."

Receipt of an $F_3$ code effects the selective setting of stages 1 through 4 of Shift Register 801 and subsequent energization of the $F_3$ output conductor from Translator 830. Having received an $F_1$ signal, the Initial Scan for Service Flip-Flop 820 remains in the set condition until a served or $F_3''$ signal occurs. The simultaneous occurrence of the $F_1'$ and $F_3$ signals as inputs enables AND Gate 823 to energize the $F_3'$ or start dial tone conductor and enables the OR Gate 824, which in turn sets the Served Flip-Flop 825. The one output conductor of the Serve Flip-Flop 825 is the served or $F_3''$ conductor. The start dial tone conductor is employed to set the Dial Tone Flip-Flop 627, which in turn enables the Dial Tone AND Gate 632 to connect the Dial Tone Source 626 to the Subscriber's Handset Receiver 618 through OR Gates 678 and 616 and Amplifier 617. Dial tone persists until OR Gate 628 is enabled over one of its three input conductors. The first input conductor to OR Gate 628 is the "On-Hook" Conductor 633, which is energized whenever the Switchhook 679 is in the on-hook condition. The second input to OR Gate 628 is the dial off-normal signal on Conductor 689. The Off-Normal Contacts 681 on Dial 680 are closed each time the dial is moved off its normal or rest position. The third input to OR Gate 628 is the $F_{15}'$ Stop Tones Conductor, the energization of which will be explained in detail with respect to the $F_{15}$ code.

The Served Flip-Flop 825 is set not only through an $F_3$ function code in connection with a request for service but is also set upon the occurrence of an $F_7$ function code where a mobile subscriber is assigned a receiving frequency and made the terminating end of a call as will be described later. The Served Flip-Flop 825 is reset when the mobile station is placed in the on-hook condition and also upon receipt of an $F_{12}$ restore station signal as will also be described later.

The $F_3''$ conductor is energized as long as the Served Flip-Flop 825 remains in the set condition. In the preceding discussion with respect to functions codes $F_1$ and $F_2$, it is seen that the $F_3''$ conductor is an inhibiting conductor to the AND Gate 817 in conjunction with code $F_1$ and is an inhibiting conductor to AND Gate 821 in conjunction with function code $F_2$. As will be seen with respect to the remaining function codes, the $F_3''$ conductor is also employed in several other locations in the mobile control logic.

The setting of the Flip-Flop 825 clears the way for storing the pseudo-address, which is transmitted from Radio Control to the mobile station being served for future use throughout the duration of the current call. The DATA' conductor is shown entering the Timing and Control Cable 566 in FIG. 8 and is shown emerging from the timing cable in FIG. 11. The signals on the DATA' conductor at this time comprises the pseudo-address code elements which immediately succeed the $F_3$ four bit function code. The pseudo-address is to be inserted in the Pseudo-Address Register 1125. The exact number of register stages required has not been designated, but rather these stages have been labeled 1–$p$ as the exact number of code elements in the pseudo-address is unimportant to an understanding of this invention. The data address signals are gated through the Pseudo-Address AND Gate 1123 and the pseudo-address stage input AND gates such as 1124 and 1125. The address elements appear serially at the output of AND Gate 1123 and in accordance with the enablement of the AND gates $n+1$ to $n+p$ such as 1124 and 1125, the serial information signals will be inserted in stages 1 through $p$ of the Register 1126.

An initial "1" was set into the first stage of the Counter 1101 upon the occurrence of the $F_1'$ signal and in the transmission of the Nationwide Address, as determined by the strapping in the Own Number Plug 1102, from the mobile station to Radio Central, this initial "1" was advanced through stages 1 through $n+1$ in the Counter 1101. The initial "1" was held in stage $n+1$ awaiting an $F_3$ signal and at the time the first element of the pseudo-address code, which accompanies the $F_3$ code, reaches the output of AND Gate 1123, the initial "1" still resides in the $n+1$ stage of 1101. The "1" Output Conductor 1145 of stage $n+1$ of Register 1101 enables the $n+1$ Input and Output AND Gates 1124 and 1127, respectively. Accordingly, the first bit of the serial pseudo-address occurring at the output of AND Gate 1123 is inserted in the first stage of the Pseudo-Address Register 1126, and simultaneously, the "1" output conductor of stage 1 of the pseudo-address register is connected through AND Gate 1127 and OR Gate 1130 to the A terminal of the Match Circuit 1152. If the first element of the pseudo-address code is a "1," the first stage of Register 1126 will be set; however, if it is a "0," the stage will remain reset. It should be noted that Pseudo-Address Register 1126 is reset upon enablement of OR Gate 1178, which has three inputs, namely, (1) on-hook; (2) $F_{12}'$ which is the restore station function code; and (3) the $F_3'$ conductor. The signal on the $F_3'$ conductor as shown in line 7 of FIG. 16, occurs during the fourth bit period of the $F_3$ function code, therefore, the pseudo-address register is cleared in preparation for receipt of the incoming pseudo-address code. During succeeding bit periods, the initial "1" is advanced through the Counter 1101 and the succeeding elements of the pseudo-address code are inserted in the appropriate stages of the Register 1126.

In order to assure that the pseudo-address has been properly inserted in the Pseudo-Address Register 1126, each address element set in a stage of Register 1126 is compared in the Match Circuit 1152 with the information which was employed to set that stage. If a mismatch occurs, action in the mobile station is halted as operation with an improper pseudo-address would be impossible. As described above, during the time the initial "1" resides in stage $n+1$ of Counter 1101, the "1" output conductor of stage 1 of the Pseudo-Address Register 1126 is gated to the A input terminal of the Match Circuit 1152 and during the same interval, the first bit of the pseudo-address code appears on the DATA' conductor at the D input terminal of the Match Circuit 1152. As seen at line 9 of FIG. 16, the first inspect pulse at the output of the Delay Circuit 1158 appears at the time of the first element of the pseudo-address code. If the element set in the first stage of the Pseudo-Address Register 1126 agrees with the information on the DATA' conductor, the Match Conductor 1161 will be energized at the time of the inspect pulse; however, if there is a disagreement of data, the Mismatch Conductor 1153 will be energized at the time of the inspect pulse. If upon inspection, a match is detected, the AND Gate 1155 will be enabled to provide a signal to the $\delta/2$ Delay Circuit 1159 and a half bit period later, the OR Gate 1147 will be enabled to energize the Counter Advance Conductor 1107. The initial "1" is thereby stepped from stage $n+1$ of Counter 1101 to the stage $n+2$.

If, at the time of inspection, a mismatch occurred, the AND gate 1167 would be enabled to set the Match Flip-Flop 1165 and thereby energize the M1 conductor and deenergize the M0 conductor. Further, upon the occurrence of a mismatch, there is no advance pulse provided to the Counter 1101.

The inspect pulse has been discussed as an input to AND gates 1155 and 1167; however, the manner in which it is generated has not been described. As will be seen with respect to the $F_6$ through $F_{15}$ codes, inspect pulses are required as in the $F_3$ code and these pulses in each case are derived through the enablement of AND Gate 922. AND Gate 922 has four input conductors, namely, (1) the M0 conductor which is energized as long as the Match Flip-Flop 1165 remains in its reset state; (2) the C2 clock pulse conductor; (3) the Start conductor ST; and (4) Conductor 936 which is the output of OR Gate 935. As seen at line 7 of FIG. 16, the $F_3'$ conductor is energized during the fourth bit period of the $F_3$ function code; therefore, the immediately succeeding C2 clock pulse will enable AND Gate 922 and provide a signal on Conductor 926 to the OR Gate 1160 and the Delay Circuit 1158. The first inspect pulse at the output of Delay Circuit 1158 occurs one full bit period after the above-noted C2 clock pulse, and is therefore centered in time with the first bit of the pseudo-address code in the incoming message.

The Start conductor ST remains energized for the duration of the incoming $F_3$ code message. The $F_3'$ conductor remains enabled until the end of the message and the M0 conductor is energized so long as the data set in the Pseudo-Address Register 1126 agrees with the incoming data message. Accordingly, as each element of the address is properly inserted in the Pseudo-Address Register 1126, an inspect pulse is generated at the output of AND Gate 922, and therefore the initial "1" will be shifted from stage to stage in the Counter 1101. Immediately succeeding receipt of the last bit of the pseudo-address code, the End' signal on E' conductor shown in line 1 of FIG. 16 will occur to reset the Flip-Flop 558 and thereby de-energize the Start conductor ST at the input to AND Gate 922, AND Gate 922 is thereby disabled and the generation of inspect pulses is halted, thereby terminating the advance of the initial "1" through Register 1101. If the message has been fully received and the pseudo-address properly inserted in the Pseudo-Address Register 1126, the initial "1" will reside in stage $n+p+1$ of Counter 1101 at the time of the End' pulse on E' conductor. A response acknowledging receipt of the pseudo-address is provided by combining the $F_3'$ conductor with the $n+p+1$ conductor in AND Gate 1141, the output of which is one of the several inputs to OR Gate 1142. The output of OR Gate 1142 is gated through AND Gate 1143 by the E' pulse on lead E' and the output of AND Gate 1143 is processed in the Pulse Stretcher 1144. The data rate from a mobile station to Radio Central is one-eighth the data rate from Radio Central to the mobile stations, and is therefore one-eighth the rate of the C1 clock pulse source. Stretching the output of AND Gate 1143 in the Pulse Stretcher 1144 provides an input signal to the Data Respond Output AND Gate 1116, which has a pulse duration appropriate for data messages from mobile stations to Radio Central. The output of AND Gate 1116 is processed in the mobile radio transmitting equipment as described with respect to the transmission of the Nationwide Address code in the $F_1$ function code response.

Upon receipt of an acknowledgment, Radio Central assumes that the pseudo-address has been properly received and stored in the mobile station, and during succeeding transmissions of the subject call, Radio Central addresses the mobile station by means of the pseudo-address rather than the full Nationwide code.

If the pseudo-address is not properly inserted in the Pseudo-Address Register 1126, the initial "1" will not have reached the $n+p+1$ stage of Counter 1101 at the time of the E' pulse on lead E' and therefore an acknowledgement will not be generated. In this instance. Radio Central takes steps to restore the mobile station so that conditions can be properly established for future transmissions.

*$F_4$ (ISFT)—Initial Scan for TASI—(ST 0100 E)*

Figure 17:
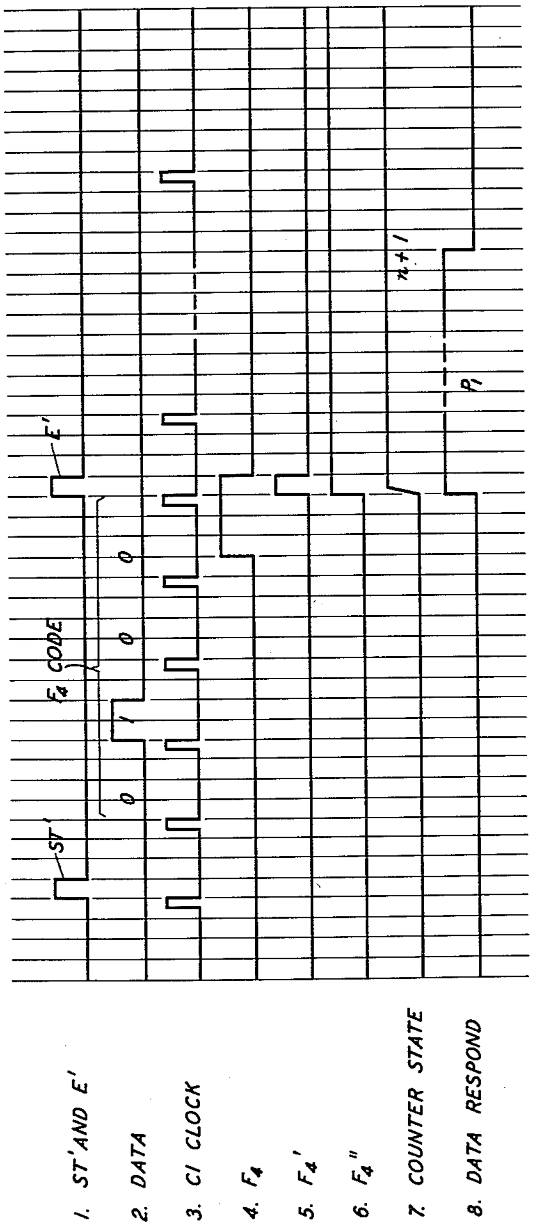

To detect mobile subscribers requiring the assignment of a speech channel, Radio Central initiates at very short time intervals, $F_4$ message codes which in effect say "Any station having a TASI request, i.e., any station having a speech or dial pulse message to transmit, and which is not now served by a message channel, respond with the first bit of your pseudo-address code." The first bit of each pseudo-address is arbitrarily established as being a "1"; therefore, whenever an $F_4$ signal reaches a subscriber requiring TASI service, Radio Central will receive a positive acknowledgment. Having received an indication that a customer requires TASI service, Radio Central will, by means of $F_5$ function codes, continue to interrogate the requesting mobile station until that station has been fully identified. The timing of operations within the mobile station upon receipt of an $F_4$ function code is shown in FIG. 17. The first four lines of FIG. 17 are similar to lines 1–4 of FIGS. 15 and 16 in that the translation conductor is energized during the fourth bit of the function code and is de-energized at the termination of the End′ pulse.

A request for TASI service is indicated in a mobile station when simultaneously the Served Flip-Flop 825 is in the "1" state; the subscriber is not presently assigned a message channel as indicated by the HTA Flip-Flop 915 being in the "0" state; and the transmit request conductor TR is energized. The transmit request conductor TR originates in FIG. 6 and is energized whenever AND Gate 644 is enabled or the Dial 680 is off-normal as indicated by closure of the Off-Normal Contacts 681.

Dial signaling from a mobile station to Radio Central is by means of voice frequency pulses which are transmitted via a normal mobile transmit and land receive message channel; therefore, a message channel is required by a mobile station not only when a subscriber has initated a speech burst but also when a subscriber has started dialing. In this one specific illustrative embodiment, dial pulses are transmitted at a much higher repetition rate than is normally employed in conventional land dial switching systems. High speed dial pulses are employed to conserve time and to simplify the assignment of speech channels. With slow speed dial pulses, Radio Central would be required to assign or at least consider assigning a mobile transmitted channel for each dial pulse.

The Dial 680 has two sets of normally open contacts, namely, the Pulse Contacts 682 and the Off-Normal Contacts 681. The Pulse Contacts 682 open and close in accordance with the digit being transmitted. That is, the Contacts 682 during one digit period close a number of times equal to the digit being dialed. The off-normal contacts close when the dial is removed from its position of rest and remain closed until the dial returns to rest. The off-normal contacts are employed to (1) restore the Dial Tone Flip-Flop 627 to its reset state; and (2) through enablement of OR Gate 687, energize the Transmit Request Conductor TR.

The Pulse Contacts 682 are employed to selectively enable the AND Gate 685 and thereby connect the Tone Source 684 to the Speech Detector 646 and the Audio Amplifier 649 in parallel. The Tone Source 684 is at audio frequencies and appears to the Speech Detector 646 and the Amplifier 649 like a speech signal from the Telephone Transmitter 619. In the following discussion, it will be seen how the enablement of the Speech Detector 646 under control of a speech signal will effect the assignment of a message transmit channel to the mobile station and how this information in transmitted through the radio transmitter to Radio Central.

In a mobile station requesting a TASI assignment, the ISFT Flip-Flop 911 is operated upon receipt of an $F_4$ code. The Flip-Flop 911 is set upon the enablement of the AND Gate 901 which has five inputs, namely, (1) the $F_3''$ conductor which, while enabled, indicates that the mobile station is presently served; (2) the $F_6''$ inhibiting conductor which, when energized, indicates that the mobile station has a transmitting channel assignment; (3) the $F_4$ conductor; (4) the TR conductor which, when energized, indicates a transmit request; and (5) the E′ conductor. The $F_4'$ conductor, which is the output of AND Gate 901 when energized, sets the ISFT Flip-Flop 911 to its "1" state, and through the enablement of OR Gates 1103 and 1105, conditions the Counter 1101 so that stage $n+1$ is set, and all other stages are reset. The Counter 1101 is reset to the $n+1$ stage in preparation for transmission of the succeeding elements of the pseudo-address code to Radio Central in response to $F_5$ codes which follow. The $F_4''$ conductor is the one output conductor of the ISFT Flip-Flop 911 and is employed as a conditioning signal in following $F_5$ and $F_6$ code operations.

When the Counter 1101 is in the $n+1$ stage, the $n+1$ Output AND Gate 1127 is enabled to gate the "1" output conductor of stage 1 of the Pseudo-Address Register 1126 to the input of AND Gate 1140, which in turn is enabled by the enablement of OR Gate 1134 under the influence of the $F_4'$ conductor. The output of AND Gate 1140, like the output of AND Gate 1141, is one of the several inputs to OR Gate 1142 and transmission of the first bit of the pseudo-address code from the mobile station to Radio Central proceeds through the enablement of AND Gate 1143, OR Gate 1115, and AND Gate 1116 as previously described.

Having acknowledged receipt of the $F_4$ code, the mobile station is now prepared to receive a series of $F_5$ codes or subsequent scans for TASI to permit Radio Central to elicit sufficient information to identify the mobile station requiring a channel assignment.

*$F_5$ (SSFT)—Subsequent Scan for TASI—(ST 0101 X E)*

It cannot be assumed that only one mobile station has responded to a particular $F_4$ code, or that there will be only one mobile station within the range of Radio Central that is prepared to act upon the receipt of $F_5$ function codes. The $F_5$ codes are employed to determine the identity of a particular mobile station requiring a channel assignment and other such mobile stations will be served after subsequent series of $F_5$ codes.

The $F_5$ code says, "The *n*th bit sent in response to an immediately preceding $F_4$ code or an immediately preceding $F_5$ code was an X. If you sent an X, respond with the next bit of your pseudo-address code. If you did not send an X, ignore the following $F_5$ codes and await receipt of the next $F_4$ code."

Figure 18:
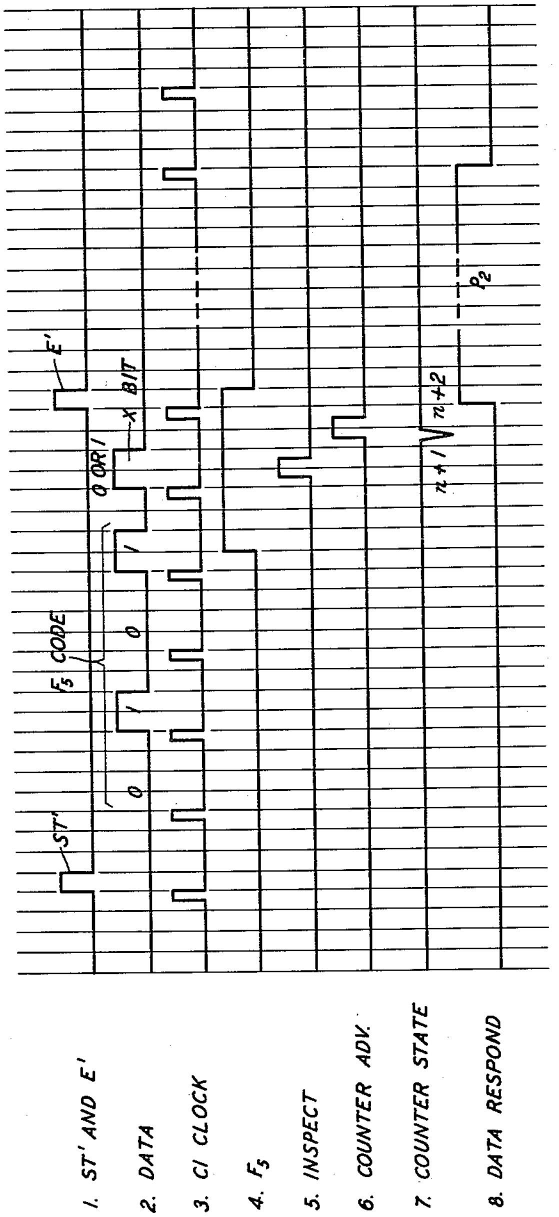

The timing of actions within a mobile station during the first $F_5$ code procedure following an $F_4$ code is shown in FIG. 18 in which lines 1 and 2 show the relationship of the ST′ and E′ pulses and the data message bits. Line 3 shows the C1 clock pulses, and in line 4, it is seen that the $F_5$ conductor at the output of Translator 830 is energized during the fourth bit of the $F_5$ data code. The AND Gate 907 is enabled by simultaneous energization of the $F_5$ conductor and the $F_4''$ conductor. The $F_5'$ conductor is the output of AND Gate 907 and is employed to generate an inspect pulse at the inputs to AND Gates 1155 and 1167, and to provide an advance pulse to Counter 1101 if coincidence occurs between the X bit of the message and the information stored in the selected stage of the pseudo-address register. Upon receipt of the first $F_5$ code immediately succeeding an $F_4$ code, the "1" output conductor of stage 1 of the Register 1126 will be gated through the $n+1$ Output AND Gate 1127, Conductor 1162, and OR Gate 1130 to the A input terminal of Match Circuit 1152. The X bit of the data message appears on the DATA′ conductor and thereby at the D input terminal of the Match Circuit 1152. As seen in FIG. 18, the inspect pulse at the output of Delay Circuit 1158 occurs during the X bit of the data message as shown at line 2 of FIG. 18. If the bit read from the first stage of the Pseudo-Address Register 1126 agrees with the X bit which appears on the DATA′ conductor, the Match Conductor 1161 at the output of Match Circuit 1152 will be energized, and upon receipt of the Inspect Pulse AND Gate 1155 will be enabled to generate an advance pulse to the Delay Circuit 1159, OR Gate 1147, and the Advance Conductor 1107. If the data and the information read from the Register 1126 do not agree, the Mismatch Conductor 1153 will be energized and the AND Gate 1167 will be enabled upon arrival of the inspect pulse. An output signal from AND Gate 1167 sets the Match Flip-Flop 1165 to de-energize the M0 conductor and energize the M1 conductor.

During the receipt of $F_5$ codes other than the first $F_5$ code immediately succeeding an $F_4$ code, the X bit which accompanies the $F_5$ code in the data message will be compared with pseudo-address code elements stored in subsequent stages of the Pseudo-Address Register 1126. Each time the X bit which accompanies an $F_5$ code matches the bit previously transmitted to Radio Central, the M0 conductor will be energized at the time of the End′ pulse, and therefore the mobile station will transmit to Radio Central the next bit of its pseudo-address code. In a mobile station in which a match occurred, the initial "1" is advanced one stage in the Counter 1101 to enable a subsequent pseudo-address register output gate intermediate to output gates $n+1$ through $n+p$, and thereby gate the "1" output conductor of one of the intermediate stages of the Pseudo-Address Register 1126 through to Conductor 1162. The signal on Conductor 1162 is gated through AND Gate 1140 under the influence of the $F_5'$ conductor, and as seen in FIG. 11, the output of AND Gate 1140 is combined in AND Gate 1143 with the M0 conductor and the E' conductor to provide a signal to the Pulse Stretcher 1144, the OR Gate 1115, and the AND Gate 1116.

Radio Central continues to interrogate the mobile stations with $F_5$ function codes until the station requesting message service is fully identified. Such an operation generally will not require Radio Central to interrogate the mobile stations until all elements of the code are known as Radio Central can readily compare the pseudo-address which is elicited in this manner with pseudo-address codes which are assigned subscribers which might wish TASI service.

$F_6$ (*PSFT*)—*Final Scan for TASI*—(*ST 0110 $X_{p-y}$–$X_p$ $F_1$–$F_f$ E*)

Once Radio Central has identified a subscriber requesting TASI service, a mobile transmitting message channel assignment must be made. This assignment is accomplished by means of an $F_6$ function code which says "The last bit sent by you was your $p-g$ bit and this was an X, if the bits following $p-y$ match the remainder of your pseudo-address, set your station to this transmitter frequency and acknowledge over the data channel, all other addresses wait for the next $F_4$ code." The $F_6$ conductor at the output of Translator 830 is one of the two input signals to the AND Gate 910, the other input being the $F_4''$ conductor. The $F_6'$ conductor at the output of AND Gate 910 is employed to provide inspect pulses for use in FIG. 11 and is also one of the two input signals to the AND Gate 912.

The $F_6'$ conductor, like the previously described $F_3'$ conductor is one of the several inputs to OR Gate 935, the output conductor of which is connected to the AND Gate 922. In the mobile station which has been identified by Radio Central, the initial "1" has been stepped along through the Counter 1101 to a stage which is identified as $p-y$. The $p-y$ stage may be any stage intermediate to $n+1$ and $n+p$, the exact numerical value of $p-y$ being dependent upon the number of $F_5$ codes required to fully identify the requesting mobile station. In the mobile station to which the $F_6$ code is directed, the M0 conductor will be energized and the C2 clock pulses will be gated through AND Gate 922 to provide inspect pulses at the input terminals of AND Gates 1155 and 1167. The pseudo-address code elements accompanying the $F_6$ code appear in serial form on the DATA' conductor, and therefore at the D input terminal of the Match Circuit 1152. In step with the pseudo-address code elements on the DATA' conductor, the initial "1" will be shifted through the Counter 1101 to enable the $n+p-y$ through $n+p$ output AND gates and thereby connect the "1" output conductors of the $n+p-y$ through $n+p$ stages of the Pseudo-Address Register 1126 to the Conductor 1162, and thereby to the A input terminal of the Match Circuit 1152. If the data elements on the DATA' conductor agree with the information read from the Pseudo-Address Register 1126, the Match Flip-Flop 1165 will remain in the reset state. The M0 conductor will therefore remain energized and the AND Gate 922 will remain enabled to generate a series of inspect pulses and a series of advance pulses to the Counter 1101.

When the initial "1" reaches the $n+p+1$ stage, the AND Gate 912 will be enabled to set the HTA Flip-Flop 915 and energize the reset conductor of the RFA Flip- Flop 944. In the mobile station to which the $F_6$ code is directed, the M0 conductor will be energized when the initial "1" reaches the $n+p+1$ stage in the Counter 1101 and the following frequency assignment code will be gated through AND Gate 724 and AND Gates 729 and 730 to the stages 1–4 of the Frequency Assignment Register 731. The code elements thus inserted in the Frequency Assignment Register 731 are compared with the incoming data as was the pseudo-address code compared with the incoming data. As long as the information set in the Register 731 agrees with the incoming data, the M0 conductor will remain energized and the AND Gate 922 will remain enabled to generate inspect and advance pulses.

When energized, the $F_6''$ conductor enables OR Gate 726 and thereby enables AND Gate 724 and OR Gate 752. The output of OR Gate 752 is connected through Condenser 751 to reset all stages of the Frequency Assignment Register 731 and to reset the FA Flip-Flop 740 which prepares for receipt of the incoming frequency assignment code. The frequency assignment code appears on the DATA' conductor which is the second input to AND Gate 724 and the information at the output of AND Gate 724 is selectively gated to the stages 1 through $f$ of the Frequency Assignment Register 731 in accordance with the enablement of input AND gates such as 729 and 730. The enabling conductors to AND Gates 729 through 730 are the $n+p+1$ through $n+p+f$ output conductors of the Counter 1101.

Figure 19:
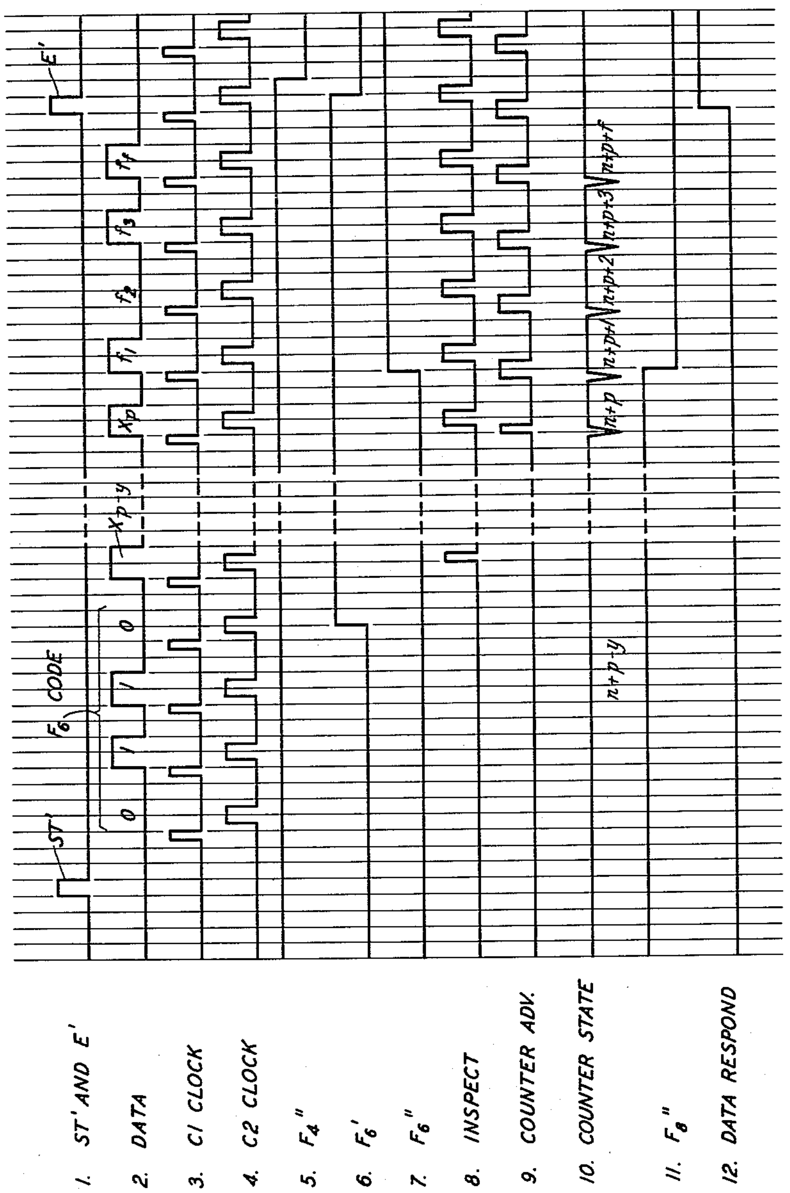

As seen in FIG. 19, the End signal immediately succeeds the last element of the data message and thereby the Start conductor is de-energized to disable the AND Gate 922 and thereby halt the generation of inspect and advance pulses.

The FA conductor, when energized, inhibits AND Gate 724. This inhibiting action is not required during the receipt of an $F_6$ code; however, it is required in the processing of an $F_8$ code message, and its operation will be described with respect to that code. The $F_6'$ conductor, like the output of AND Gates 1140 and 1141 is one of the several inputs to OR Gate 1142, and its enablement initiates a one bit response to Radio Central acknowledging receipt of the message and proper insertion of the frequency assignment code in the Frequency Assignment Register 731.

$F_7$ (*TC*)—*Terminating Call*—(*ST 0111 $A_1$–$A_n$ $P_1$–$P_p$ E*)

Figure 20:
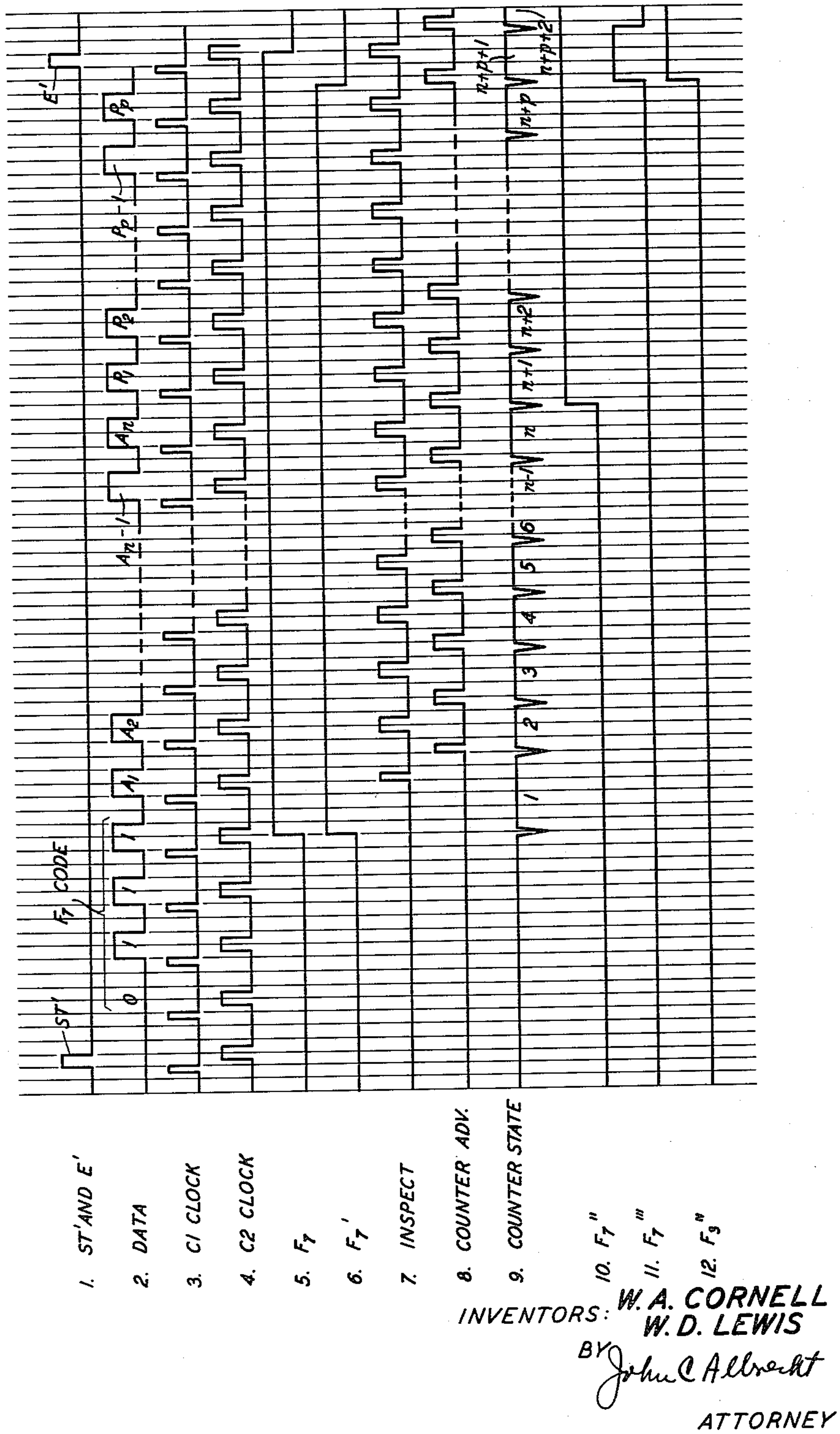

A call to a mobile subscriber is initiated by means of an $F_7$ code which in effect says, "The mobile station having a Nationwide Address defined by the code $A_1$–$A_n$, assume a pseudo-address $P_1$–$P_p$ included in this message; start ringing tone within the mobile station to alert the mobile subscriber; and acknowledge receipt of this call." The timing of actions within the mobile control logic upon receipt of an $F_7$ code is shown in FIG. 20. The serial data message as received at the mobile station is shown in detail in lines 1 and 2 of FIG. 20, and it is seen at line 4 that the $F_7$ output conductor from Translator 830 is energized during the fourth bit of the function code.

AND Gate 928 is inhibited when the mobile station is previously served by Radio Central as indicated by energization of the $F_3''$ conductor. Energization of the $F_7$ conductor enables the AND Gate 928 in the absence of an inhibiting signal on the $F_3''$ conductor. The $F_7'$ conductor, which is the output of AND Gate 928 (1) is employed to enable OR Gate 935 and thereby initiate the generation of inspect pulses; (2) is one of the two input conductors to AND Gate 931, which, as will be seen later, is employed to effect setting of the Terminating Call Flip-Flop 933; and (3) appears as an input conductor to OR Gates 1104 and 1105, the simultaneous enablement of which sets stage 1 of Counter 1101 and resets all other stages thereof. Having set the initial "1" in stage 1 of the Counter 1101, the mobile station is now prepared to compare the incoming serial Nationwide Address with its own Nationwide Address as determined by the strapping of the Own Number Plug 1102. This comparison of incoming data and the address of the mobile station comprises a step-by-step comparison of the data bits in the Match Circuit 1152. The incoming Nationwide Address appears at the D terminal of the Match Circuit 1152 and the mobile station address appears in serial form at the output of the Own Number Plug 1102 on Conductor 1168. At the time the first element of the Nationwide Address appears on the DATA′ conductor and at the D terminal of Match Circuit 1152, the initial "1" in the Counter 1101 resides in stage 1. During the period of time at which the data and local address appear at the D and A terminals of the Match Circuit 1152, the inspect pulse generated through the enablement of AND Gate 922 reaches the output of the Delay Circuit 1158, and thereby at the input to AND Gates 1155 and 1167. As previously described, if a match of data and local address occurs at the time the Inspect Pulse AND Gate 1155 will be enabled to generate an advance pulse to the Conductor 1107 at the advance terminal of the Counter 1101. Accordingly, the initial "1" will be advanced one stage in the Counter 1101 and the next bit of the local address will be compared with the succeeding bit of the incoming data. If a mismatch occurs, the AND Gate 1167 will be enabled to set the Match Flip-Flop 1165 and by deenergization of the M0 conductor, disable the AND Gate 922 and thereby halt the generation of additional inspect and advance pulses.

In the mobile station to which the $F_7$ code is addressed, the Match-Flop 1165 will have remained reset after the entire Nationwide Address in the data message has been compared with the strapping of the Own Number Plug 1102, and the initial "1" will reside in stage $n+1$ of Register 1101.

The mobile station is now prepared to accept and store the pseudo-address included in the $F_7$ code in the Pseudo-Address Register 1126. As in the previously described $F_6$ code, each element of the pseudo-address code inserted in the Register 1126 is compared with the incoming data message to insure proper setting of the Register 1126.

When the initial "1" in Counter 1101 reaches the $n+1$ stage, the AND Gate 931 is enabled, the Terminating Call Flip-Flop 933 is set and the $F_7''$ conductor is energized. The $F_7''$ conductor is one of the two inputs to AND Gate 1120, the other input being the $F_3''$ conductor which is an inhibiting conductor. Accordingly, if the addressed mobile station is not previously served by Radio Central, as indicated by the energization of the $F_3''$ conductor, AND Gate 1120 will be enabled upon energization of the $F_7''$ conductor, and this (1) resets all stages of the Pseudo-Address Register 1126; and (2) enables AND Gate 1123 to gate the DATA′ conductor through to the $n+1$ through $n+p$ Input AND gates such as 1124 and 1125. The $F_3''$ conductor therefore prevents seizure of a busy or served mobile station by means of a terminating call. As described with respect to the $F_6$ code, the initial "1" in Counter 1101 proceeds from stage $n+1$ through intermediate stages to stage $n+p+1$ if the data is properly inserted in the Register 1126.

Upon sucessful insertion of the newly assigned pseudo-address in the Register 1126, the initial "1" resides in stage $n+p+1$ of Register 1101, and at this time, the AND Gate 942 will be enabled to energize the $F_7'''$ conductor. The $F_7'''$ conductor is one of the several inputs to OR Gate 1142, and its momentary energization initiates a one bit data response to Radio Central as previously described with respect to the $F_6$ code.

*$F_8$ (RFA)—Receiver Frequency Assignment—*
*(ST 1000 $P_1$–$P_p$ $f_1$–$f_f$ E)*

Once a request for service has been detected and a terminating mobile station has been selected, message channels between the originating and terminating subscribers will be assigned in accordance with the message requirements of these stations. That is, upon initiation of a speech burst at the originating station, a message channel will be provided from the originating station to the terminating station, and upon initiation of a speech burst at the terminating station a speech channel will be assigned from the terminating station to the originating station. The $F_8$ code is employed to assign a receiver frequency to a mobile station whether it be an originating or a terminating station. The $F_8$ code says, "The mobile station which is assigned the pseudo-address which is included in this transmission, assume the following receiving frequency assignment and acknowledge receipt thereof to Radio Central."

Figure 21:
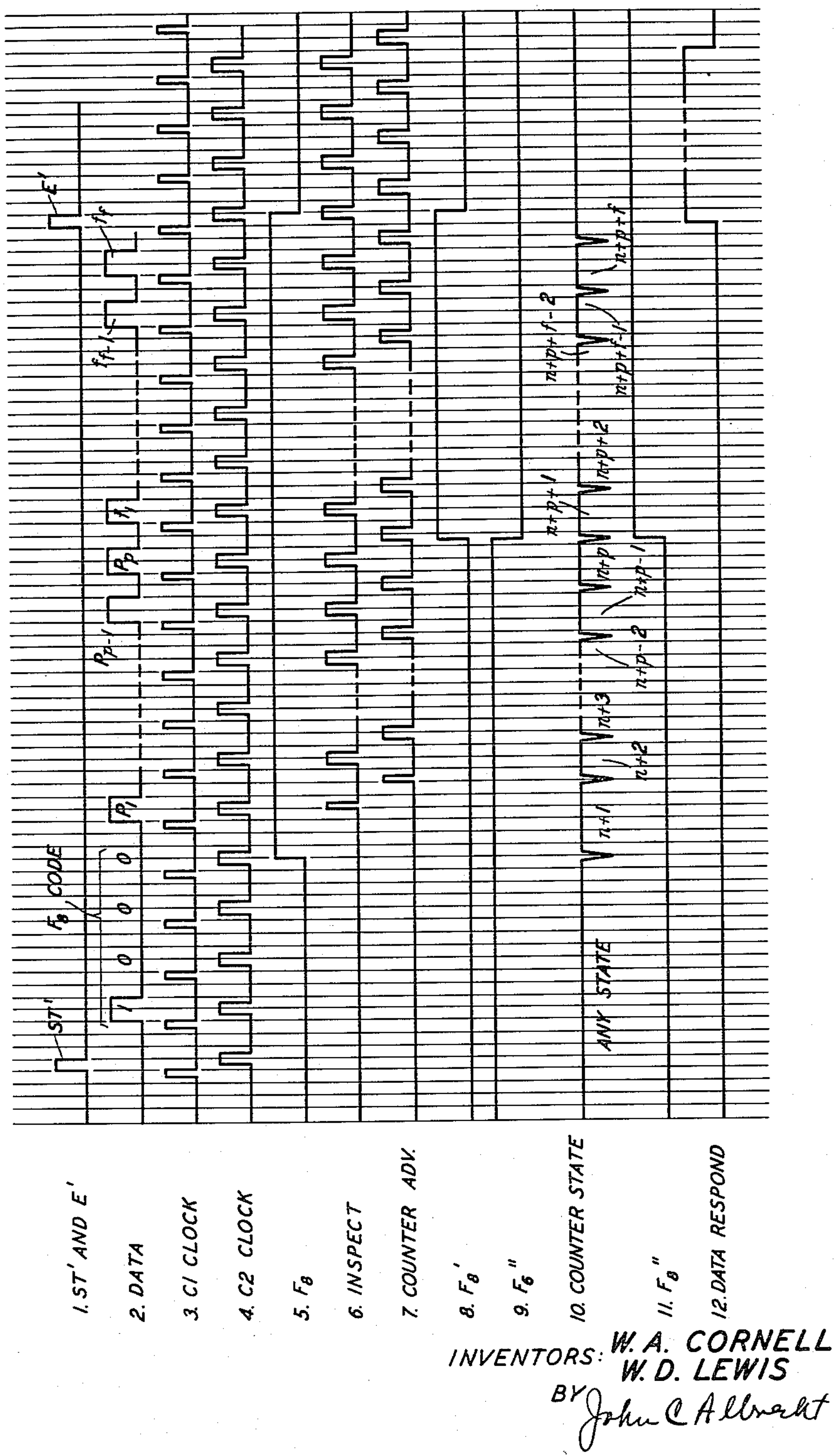

The timing of events in the mobile station upon receipt of an $F_8$ code is shown in FIG. 21. As in the previous function timing diagrams, the translator output, in this case the $F_8$ conductor, is energized during the fourth bit period of the received $F_8$ function code. The energization of the $F_8$ conductor (1) enables OR Gates 1103 and 1105 to set the initial "1" in the $n+1$ stage of Counter 1101 and reset all other stages thereof; (2) enable OR Gate 935 to in turn enable AND Gate 922 and thereby initiate, as described with respect to previous codes, the generation of inspect and advance pulses to the arrangements of FIG. 11; and (3) provide an input signal to AND Gate 943.

The $F_8$ code message is directed to a particular addressee, therefore, the pseudo-address code which follows the $F_8$ code elements is compared bit by bit on a serial basis with the pseudo-address code previously stored in the Pseudo-Address Register 1126. In the mobile station to which the $F_8$ code is directed, the pseudo-address code elements will be in complete correspondence with the incoming data, the initial "1" in the Counter 1101 will advance through the stages $n+2$ through $n+p$, and upon completion of the address code matching process, the initial "1" will reside in stage $n+p+1$ of Counter 1101. During the same interval, the Match Flip-Flop 1165 will remain in the reset state. Accordingly, the AND Gate 943 will be enabled upon completion of the address matching procedure to energize the $F_8'$ conductor. When energized, the $F_8'$ conductor (1) sets the Frequency Assignment Flip-Flop 944 to its "1" state, thereby energizing the $F_8''$ conductor; and (2) enables OR Gate 925 to reset the Have Transmit Assignment Flip-Flop 915.

The $F_8''$ conductor prepares the Frequency Assignment Register 731 and its attendant circuitry for receipt of the receiver frequency assignment code which is included in the $F_8$ code message. The $F_8''$ conductor, when energized, enables OR Gate 726, and in turn OR Gate 752. A transient output signal is taken from OR Gate 752 through Condenser 751 to reset all stages of the Frequency Assignment Register 731 and to reset the Frequency Assignment Flip-Flop 740. The "1" output conductor FA from the Frequency Assignment Flip-Flop 740 appears as an inhibiting conductor to AND Gate 724. Therefore, upon the resetting of Flip-Flop 740, AND GATE 724 is enabled under the influence of the $F_8''$ conductor and the frequency assignment code elements on the DATA′ conductor are gated through to the input terminals of the input AND gates such as 729 and 730. The input AND gates in accordance with the setting of the stages $n+p+1$ through $n+p+f$ of the Counter 1101 are selectively and sequentially operated to gate the incoming frequency assignment code elements into stages 1 through $f$ of the Register 731. The code elements inserted in the Frequency Assignment Register 731 are taken through OR Gate 772 and 1130 to the A input terminal of Match Circuit 1152. Therefore, as the code elements are set in Register 731, they are compared bit by bit with the incoming data on the DATA′ conductor which is connected to the D input terminal of the Match Circuit 1152. So long as there is correspondence between the information presented at the A and D terminals of the Match Circuit 1152, AND Gate 922 will remain enabled to continue the flow of inspect pulses to the AND Gates 1155 and 1167 and the advance pulses on Conductor 1107 to the advance terminal of Counter 1101.

The process of insertion of the frequency assignment code in the Register 731 is completed when the counter reaches the $n+p+f$ stage. The signal on the $n+p+f$ conductor, which is one of the inputs to AND Gate 730, is processed in the Delay Circuit 743, and thereby the Frequency Assignment Flip-Flop 740 is set one bit later. The "1" Output Conductor FA from the Flip-Flop 740 inhibits AND Gate 724 to prevent further accidental flow of data to the input AND gates such as 729 and 730, and also in conjunction with the $F_8''$ conductor, enables AND Gate 939 to provide a pulse on the $F_8'''$ conductor.

The $F_8'''$ conductor is one of the several inputs to OR Gate 1142, therefore, upon the occurrence of the End' pulse on lead E', AND Gate 1143 is enabled to initiate a data response to Radio Central.

*$F_9$ (RI)—Ringing Induction—(ST 1001 $P_1$–$P_p$ E)*

In the process of establishing a connection to a mobile station, Radio Central, by means of an $F_7$ code, initiates ringing in the desired terminating station and by means of an $F_9$ code, initiates ringing induction tone in the originating station to indicate to the originating subscriber that the connecting process has been undertaken. The originating station was assigned a pseudo-address code during the $F_3$ final scan for service and this address is used in the $F_9$ code, which says "The mobile station assigned this pseudo-address, initiate ringing induction in the mobile station and acknowledge receipt of this message to Radio Central."

Figure 22:
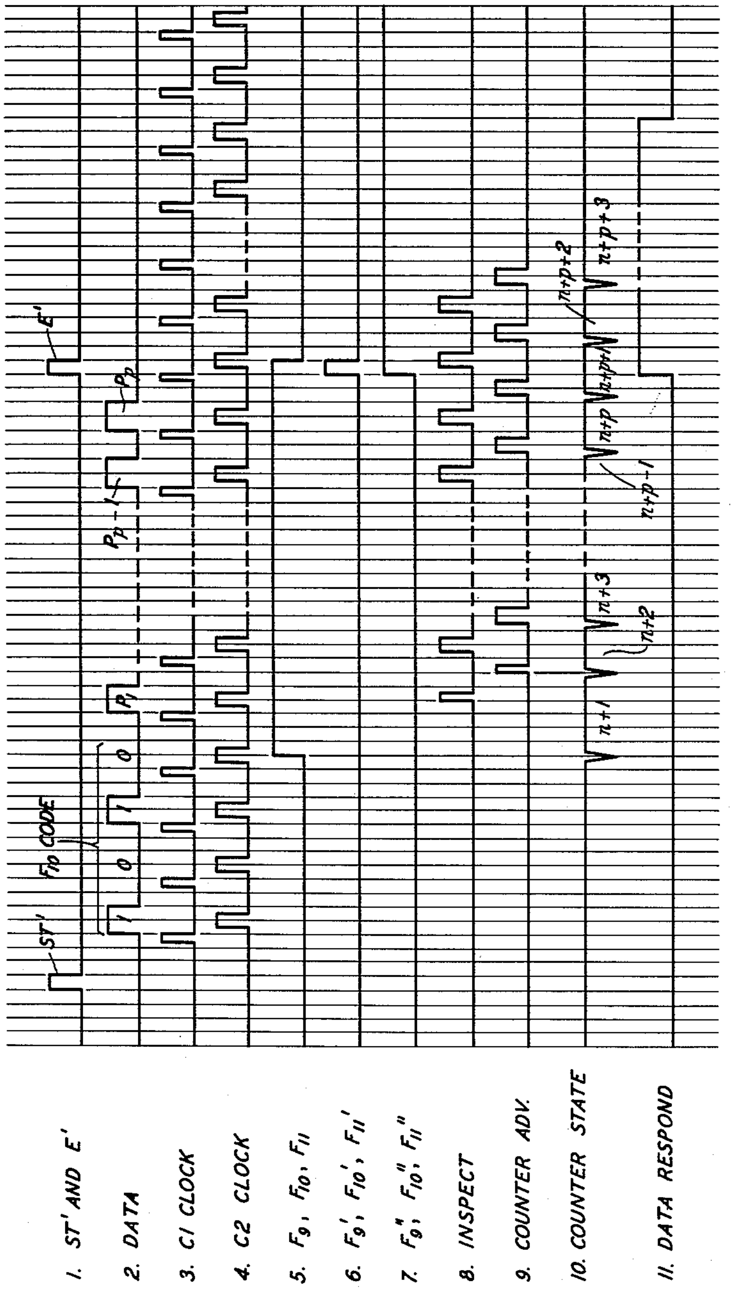

The sequence of events in a mobile station upon receipt of an $F_9$ code is shown in FIG. 22. Upon receipt of an $F_9$ code, the mobile station, as in the case of the $F_8$ code, proceeds to compare the incoming serial pseudo-address code with the code stored in the Pseudo-Address Register 1126. Energization of the $F_9$ conductor (1) sets the initial "1" in stage $n+1$ of Counter 1101 and resets all other stages thereof; and (2) enables OR Gate 935 to initiate the generation of inspect pulses.

In the mobile station to which the $F_9$ code is directed, the Match Flip-Flop 1126 will be in the "0" state at the time the End' pulse occurs, enabling AND Gate 1002, and in turn AND Gate 1001. The $F_9'$ conductor at the output of AND Gate 1001 sets the Ringing Induction Flip-Flop 1007 to its "1" state, thereby energizing the $F_9''$ conductor. The $F_9''$ conductor (1) enables AND Gate 629 to connect the Ringing Induction Tone Source 623 through OR Gates 678 and 616 to the Amplifier 617 and the Subscriber's Handset Receiver 618; and (2) enables OR Gate 1142 to initiate a one bit acknowledgment to Radio Central.

*$F_{10}$ (BY)—Busy Tone—(ST 1010 $P_1$–$P_p$ E);*
*$F_{11}$ (NA)—Not Available—(ST 1011 $P_1$–$P_p$ E)*

The $F_{10}$ and $F_{11}$ codes are processed in the mobile station in a manner similar to the above-described $F_9$ code procedure. The $F_{10}$ code is employed to initiate busy tone in an originating mobile station, thereby indicating that the called subscriber line is busy and the $F_{11}$ code is employed to initiate a not-available tone in an originating mobile station. This latter code is applied after Radio Central has found that a called mobile station is not in service, i.e., the subscriber is away from the car or the called mobile station is outside the service limits.

In each of these instances, Radio Central addresses the mobile station by the previously assigned pseudo-address code and recognition of the code is accomplished as was described with code $F_9$.

The $F_{10}$ conductor in conjunction with the output of AND Gate 1002 is employed to enable the AND Gate

1004 and thereby set the Busy Flip-Fop 1006 to its "1" state. Similarly, the $F_{11}$ conductor in conjunction with the output of AND Gate 1002 is employed to enable the AND Gate 1007 and thereby set the Not-Available Flip-Flop 1009 to its "1" state. Enablement of the $F_{10}''$ conductor enables the Busy AND Gate 630 to gate Busy Tone Source 624 to the Subscriber's Handset 618 and energization of the $F_{11}''$ conductor enables the Not-Available AND Gate 631 to gate the Not-Available Tone Source 625 to the Subscriber's Handset 618. Both the $F_{10}''$ and the $F_{11}''$ conductors are inputs to the OR Gate 1142 and energization of either of these conductors initiates a data response to Radio Central as described priorly.

All three tones, that is, the Ringing Induction, the Busy, and the Not-Available tones are continued until the receiver is placed on hook to energize the "On-Hook" conductor or until Radio Central transmits an $F_{15}$ code which indicates that tones should be restored in the addressed mobile station. Upon occurrence of either of these conditions, OR Gate 1008 is enabled to reset the Flip-Flops 1006, 1007, and 1009.

*$F_{12}$ (RS)—Restore Station—(ST 1100 $P_1$–$P_p$ E)*

Upon receipt of an $F_{12}$ code, the $F_{12}$ conductor is energized, and as in the preceding codes, a comparison is made between the pseudo-address code which accompanies the $F_{12}$ code and the code stored in the Pseudo-Address Register 1126. In the mobile station to which the $F_{12}$ code is directed, the AND Gate 1017 will be enabled upon occurrence of the End' pulse, and thereby the Flip-Flop 1023 will be set to its "1" state. The "1" output output conductor of Flip-Flop 1023 is one of the two input conductors to AND Gate 1018, the other input conductor being the $F_{12}$ conductor. Enablement of AND Gate 1018 energizes the $F_{12}'$ conductor which, as noted above, is one of the inputs to OR Gate 1178, the output of which is connected to the reset terminals of stages 1 through $p$ of the Pseudo-Address Register 1126. Accordingly, in the mobile station to which the $F_{12}$ code is directed, the Pseudo-Address Register 1126 is reset to release the pseudo-address code.

*$F_{13}$ (DA)—Detect Answer—(ST 1101 $P_1$–$P_p$ E)*

The $F_{13}$ code is employed to detect an answer in a terminating mobile station in which ringing has been initiated. In the establishment of a call to a mobile station, an $F_7$ code is sent to the terminating subscriber to initiate ringing, and successive $F_{13}$ codes are employed to detect an answer in that station.

Comparison of the pseudo-address accompanying an $F_{13}$ code with the pseudo-address in the Register 1126 is accomplished as was described with respect to preceding codes. As in the case of the $F_{12}$ code, the Flip-Flop 1023 will be set upon the occurrence of the E' pulse in the mobile station to which the code is addressed. If the addressed mobile station is in the off-hook condition upon receipt of an $F_{13}$ code, the AND Gate 1020 will be enabled to energize the $F_{13}'$ conductor, which also is one of the several inputs to the OR gate 1142. Accordingly, if the mobile station is in the off-hook state upon receipt of an $F_{13}$ code, an acknowledgment will be sent to Radio Central indicating that a message channel may now be established between the calling subscriber and the called subscriber or vice versa, in accordance with the occurrence of speech bursts at these stations.

*$F_{14}$ (RC)—Release Channel—(ST 1110 $P_1$–$P_p$ E)*

Message channels are released for service by means of an $F_{14}$ code directed to a particular pseudo-addressee and that code says "Disable your message transmitter or receiver, and acknowledge via the data channel." In the mobile station to which an $F_{14}$ code is directed, the Flip-Flop 1023 will be set as previously described and the AND Gate 1021 will be enabled to energize the $F_{14}'$ conductor. The $F_{14}'$ conductor (1) enables OR Gate 1142 to generate a data responsive to Radio Central; and (2) enables OR Gate 752 to reset the Frequency Assignment Register 731; (3) resets the HTA Flip-Flop 915 to de-energize the $F_6''$ conductor, which, when energized, indicates the mobile station has a transmit message channel assignment; and (4) resets the RFA Flip-Flop 944.

*$F_{15}$ (RT)—Restore Tones—(ST 1111 $P_1$–$P_p$ E)*

The $F_{15}$ code is employed to remove Ringing Induction, Busy, and Not-Available tones in an addressed mobile station by enablement of the AND Gate 1022. In FIG. 10, the $F_{15}'$ conductor which is the output of AND Gate 1022 is shown as an input to OR Gate 1008, the output of which is connected to the reset terminals of Flip-Flops 1006, 1007, and 1009. Resetting of these flip-flops disables the associated AND gates in FIG. 6, and thereby removes these tones from the Subscriber's Handset 618. The $F_{15}'$ conductor is also an input to OR Gate 934, which resets a Terminating Call Flip-Flop 933, thereby de-energizing the $F_7''$ conductor to disable the AND Gate 621, which removes ringing tone from the Ringer 620.

The $F_{15}'$ conductor also enables OR Gate 1142 to generate a data response to Radio Central.

Having described the function codes in detail, it will now be shown how these codes are employed in a typical call. It must be remembered that the Common Control 301 of Radio Central has means for timing and generating function code orders at appropriate times to provide service to the mobile stations as required.

Requests for TASI service, i.e., requests for speech channels are handled with a minimum of delay in order to avoid loss in speech content. Accordingly, $F_4$ codes, the initial scan for TASI service, are originated by Radio Central at extremely short time intervals. If a request for TASI service is indicated by the response of a mobile station, Radio Central will initiate $F_5$ and $F_6$ codes, that is, intermediate scans and final scan for TASI service, to fully identify the mobile station requiring TASI service and to assign a message channel thereto. If there are no mobile stations currently served by Radio Central, $F_4$ codes are omitted, or if there is no response to an initial scan for TASI service, $F_5$ and $F_6$ codes are omitted between $F_4$ codes.

Requests for service do not require as rapid attention as do requests for TASI service, therefore, $F_1$ codes, the initial scan for service, are from time to time interleaved between scans for TASI service. If responses indicative of a request for service are not forthcoming, $F_2$ and $F_3$ codes are omitted between $F_1$ code transmissions. If a mutilated code is received in response to an $F_1$ scan, Radio Central initiates an $F_2$ code to order the mobiles requesting service to hang up and try again. If a proper mobile response is received, a final scan for service $F_3$ code is employed to assign the requesting mobile a pseudo-address and to initiate dial tone in the mobile station. In an originating call, a mobile station requesting service response with its full Nationwide Address. Radio Central, upon receipt of this address, orders the responding mobile station by means of an $F_3$ code to assume an assigned pseudo-address and to initiate dial tone within the mobile station.

The mobile subscriber is now prepared to signal to Radio Central the desired destination of his call by means of the Dial 680. Dial signals are transmitted from a mobile station to Radio Central as tone pulses on a message channel. The dial tone pulses are similar to speech bursts and are employed to request a TASI assignment. The dial pulse interpulse period is less than the hangover time of the Speech Detector 646; therefore, a message channel assignment is retained during a dial pulse sequence.

As in a conventional telephone switching system, the dialed information is stored in an incoming register at Radio Central and is employed in the establishment of the call to the terminating mobile or land station. If the call is directed to a land station connection will be effected through the Radio Switching Network 308 to the trunks such as 320 and 321, and the Land Central Office 314. If the call is directed to another mobile station within range of the same Radio Central, the connection is effected through Radio Switching Network 308, and selected ones of the trunks such as 309, 310, 311, and 312.

In the case of a call to another mobile station, an $F_7$ code is employed to alert the terminating subscriber by the initiation of ringing tone in the called mobile station, and to assign a pseudo-address to the terminating station to be employed throughout the duration of the subject call. From time to time after an $F_7$ terminating call code has been transmitted, Radio Central initiates $F_{13}$, scans to detect answer codes, to determine whether or not the addressed mobile station has answered the call. When the terminating mobile answers, the ringing tone is removed by energization of the off-hook conductor, and conditions are established to transmit a data response to Radio Central upon receipt of an $F_{13}$ code.

Radio Central, by means of $F_9$ ringing induction codes, orders an originating mobile station to initiate ringing induction tone in that station and thereby informs the originating subscriber that steps are underway to effect the desired connection.

Upon detection of an answer, Radio Central employs an $F_{15}$ restore tones code to remove ringing induction tone from the originating subscriber's receiver. The originating subscriber is thereby informed that the terminating party has answered and the conversation may commence.

If Radio Central determines, by means of a master memory, that the terminating subscriber station is currently busy, an $F_{10}$ code addressed to the originating subscriber is employed to initiate busy tone in the originating mobile station.

The busy tone is removed when the originating subscriber hangs up or Radio Central may remove busy tone by means of an $F_{15}$ restore tones code if desired.

If Radio Central determines that the terminating mobile station is either not in service or outside the operating limits of the radio transmitter, a not-available tone is returned to the originating subscriber by means of an $F_{11}$ code. Not-available tone is released when the originating subscriber goes to the on-hook condition or upon the occurrence of an $F_{15}$ code signal.

Once pseudo-addresses have been assigned to both the originating and terminating subscribers, preparations are complete for the assignment of message channels between the originating and terminating subscriber and vice versa in accordance with the message demands of these stations.

Upon initiation of a speech burst in the mobile station, conditions are established in the mobile station such that a request for a channel assignment will be transmitted to Radio Central in response to an $F_4$ initial scan for TASI service. Having detected a request for TASI service, $F_5$ subsequent scan for TASI service codes will be employed until the pseudo-address of the mobile station requesting service has been elicited. It may be necessary to transmit enough $F_5$ codes to determine on an individual basis all of the elements of the pseudo-address or it may be possible to determine the requesting subscriber with fewer $F_5$ codes. For example, in the course of eliciting the pseudo-address of a subscriber, reference is made to information stored in the incoming register circuits and therein it may be found after only a few bits of the address have been determined that only one pseudo-addressee has the determined bits in his code. Therefore, the questioning process may be halted after only a few $F_5$ codes. For example, even though several assigned pseudo-addresses may have similar code elements in the first few bits, it may be found that a message channel has already been assigned certain of these addresses; therefore, they cannot be the presently requesting pseudo-addressee. The final bit of the pseudo-address is obtained by means of an $F_6$ final scan for TASI service code by which a transmitter frequency assignment is also made.

The Speech Detector 615 has a relatively short attack time compared to its hangover period. That is, a speech burst is detected with little delay; however, intersyllibic pauses go unnoticed as the hangover period exceeds such short pause periods.

In accordance with the traffic requirements, Radio Central may permit a mobile station to retain a message channel assignment for several speech periods or in times of heavy traffic may assign a different message channel for each succeeding speech initiation.

A channel is released for service by Radio Central through the transmission of an $F_{14}$ code to the mobile station assigned that message channel. In the release of a channel individual $F_{14}$ code messages are transmitted to both the mobile station at which a speech burst initiated and to the receiving mobile station.

Termination of a message sequence is detected at Radio Central by means of time out circuitry. That is, if for a prolonged period of time neither the originating or terminating station indicates a request for TASI service, it is assumed that the call has been completed and the originating and terminating stations are restored by means of $F_{12}$ restore station codes and the central office registers assigned to that particular call are released for other service.

It was indicated earlier that one object of this invention is to permit a mobile subscriber to travel over wide geographical limits and to automatically or manually assume the radio frequency block assignment in accordance with the transmitting frequency of a nearby land station. Mobile subscribers which travel over wide geographical limits are generally termed "Roamers" and service to such subscribers poses particular problems. Although there may be several 32 megacycle bands such as shown in FIG. 1, frequency blocks such as shown in FIG. 2 from each band are assigned in each possible geographical location at which mobile radio service is provided. As previously indicated, the block tune oscillator such as 637 may be manually or automatically tuned until a pair of data channels are detected by the arrangements of FIG. 5. If manual tuning is employed, the subscriber tunes across the band until an enable signal is received, or if automatic tuning is employed, scanning of the band is similarly accomplished and an enable signal terminates the scanning process. In a large city, spread over wide geographical limits and having large buildings or other physical obstructions, one radio transmitter will not adequately cover all possible locations. Accordingly, several radio transmitters geographically separated in a large community are controlled by a single Radio Central common control. As a mobile subscriber reaches the fringe of coverage of a particular Radio Central transmitter, there arises the problem of providing continuity of service during a call sequence. The problem of serving a roving subscriber as he passes from the service area of one Radio Central transmitter to that of another transmitter, may be solved in several ways, each of which requires differing degrees of equipment complexity. In one arrangement, mobile stations are provided with field strength indicating arrangements. For example, when the mobile station is in a strong and readily usable transmitter field, a first signal, for example; a green light is energized, and when the mobile station has proceeded to a locality in which the field strength approaches an unusable limit, a second signal, possibly a red light, is energized. In such arrangements, the subscriber is warned that he is reaching a boundary condition and should temporarily halt his movement until after this particular call is completed.

In more elaborate arrangements, it is assumed that reciprocal transmission paths exist between Radio Central and a mobile station, and field strength measurements on each channel are monitored at Radio Central. In such arrangements, Radio Central recognizes that a mobile station is approaching a limiting transmission condition and transfers the call to an adjacent transmitter.

In either event, a roaming mobile subscriber may travel over geographical limits and may initiate a call in any of the service areas once the mobile station has tuned to a local data channel and has thereby received a station enable signal. Further, a mobile station which has tuned to a frequency block may receive calls from the Radio Central from which the data channel originates. Although a mobile radio subscriber may usually operate within rather narrow geographical limits and is usually served by a particular Radio Central, he is not limited to receiving calls only through the one Radio Central. Rather, regardless of where he travels, he may receive calls in any of the many service areas. For purposes of convenience, a mobile subscriber will generally indicate to his home Radio Central that he is traveling to a different geographical location and therefore may be reached through a particular Radio Central, or upon arrival at a new service area, may report to the Radio Central serving that area that he is now in its particular service area. In turn, the Radio Central serving the foreign area will notify the subscriber's home Radio Central to permit more rapid completion of calls.

It is to be understood that the above-described arrangements are illustrative of the application of the principles of the invention. Numerous other arrangements may be devised by those skilled in the art without departing from the spirit and scope of the invention.

What is claimed is:

1. A mobile radio telephone system comprising a plurality of mobile radio telephone stations, a radio central including common control means for generating data message codes and means for transmitting said codes to said mobile stations; and each of said mobile stations comprising means for receiving said transmitted codes, switchbook means and means responsive to a particular one of said message codes and an off-hook condition of said switchhook means for transmitting to said radio central an address code discrete to said mobile station, said address code distinct from and not corresponding to said particular one of said message codes.

2. A mobile radio telephone system comprising a radio central including common control means for generating data message codes and means for transmitting said codes and a mobile station, said mobile station including means for receiving said transmitted codes, means responsive to a particular one of said message codes for transmitting to said radio central an address code discrete to said mobile station, a first memory means for indicating that said mobile station has transmitted said address code to said radio central, a dial tone source, a subscriber's handset, and means responsive to a second particular one of said message codes for connecting said dial tone source to said subscriber handset and for transmitting an acknowledgment signal to said radio central.

3. A mobile radio telephone system in accordance with claim 2 wherein said mobile station further comprises means for transmitting dial pulse signals to said radio central and means responsive to the energization of said dial pulse transmitting means for disconnecting said dial tone source from said subscriber's handset.

4. A mobile radio telephone system in accordance with claim 2 wherein said mobile station further comprises a ringing induction tone source and means responsive to a third particular one of said message codes for applying said ringing induction tone to said subscriber's handset and for transmitting an acknowledgment signal to said radio central.

5. A mobile radio telephone system in accordance with claim 2 wherein said mobile station further comprises a busy tone source and means responsive to a fourth particular one of said message codes for connecting said busy tone source to said subscriber's handset and for transmitting an acknowledgment signal to radio central.

6. A mobile radio telephone system comprising a radio central includng common control means for generating data message codes and means for transmitting codes and a mobile station, said mobile station including means for receiving said transmitted codes, means responsive to a particular one of said message codes for transmitting to said radio central an address code discrete to said mobile station, first memory means, means for storing in said first memory means an indication that said mobile station has transmitted said discrete address code to said radio central, a second memory means operative to indicate that said radio central has recognized a request for service from said mobile station, means responsive to a portion of a second one of sad message codes and controlled by said first memory means for operating said second memory means, a dial tone source, a subscriber's handset, means controlled by said second memory means when operated for connecting said dial tone source to said subscriber's handset and for transmitting an acknowledgment signal to said radio central, register means, and means controlled by said second memory means when operated for storing another portion of said second message code in said register means.

7. A mobile radio telephone system in accordance with claim 6 wherein said mobile station further comprises means operative upon the receipt of a first part of a third one of said message codes, means controlled by said last mentioned means for comparing a second part of said third message code when received with a part of said portion of said second message code stored in said register means, said comparing means providing a match signal if the parts are alike and a mismatch signal if the parts are unlike, and means responsive to said match signal for transmitting an acknowledgement to radio central, said acknowledgement comprising another part of said portion of said second message code stored in said register means.

8. A mobile radio telephone system in accordance with claim 7 wherein said mobile station further comprises other means operative upon the receipt of a first portion of a fourth one of said message codes, means controlled by said other means for comparing a second part of said fourth message code when received with the remainder of said portion of said second message code stored in said register means, said comparing means providing a match signal if said part and said remainder are alike and a mismatch signal is unlike, frequency assignment register means, and means controlled by said other means and responsive to a match signal from said comparing means for storing a frequency assignment portion of said fourth message code in said frequency assignment register means and for transmitting an acknowledgement signal to radio central.

9. A mobile radio telephone system in accordance with claim 4 wherein said mobile station further comprises disable means responsive to said mismatch signal for restoring said mobile station to an await service status.

10. A mobile radio telephone system comprising a radio central including a time and space division transmission switching network, common control means for generating data message codes and means for transmitting said codes, said means for transmitting comprising a broadband radio transmitter and frequency division multiplexing means, said data codes being transmitted on a predetermined plurality of channels of said transmitting multiplexing means, a mobile station comprising means for receiving said transmitted codes, and means responsive to signals on said predetermined plurality of frequency multiplex channels for disabling said mobile station upon failure of signal on said predetermined channels.

11. A mobile radio telephone system comprising a radio central including common control means for generating data message codes and means for transmitting said codes; a mobile radio station comprising means for receiving said transmitted codes, register means in which a pseudo-address code is stored, means responsive to a function portion of a particular one of said message codes for indicating that a call is being directed to a mobile station, means responsive to a pseudo-address portion of said particular message code for indicating that a call is being directed to a particular subscriber's mobile station, said last mentioned means including means for comparing on a serial basis the elements of said pseudo-address portion of said particular message with the elements of said pseudo-address code stored in said register, second register means controlled by said comparing means for storing a frequency assignment portion of said message code in said second register means when said pseudo-address codes agree, and means for transmitting an acknowledgment signal to said radio central.

12. A mobile radio telephone system comprising a radio central including common control means for generating data message codes, means for transmitting said codes on first channels, and means for transmitting message intelligence signals on any one of a plurality of second channels; and a mobile station comprising means for receiving said transmitted codes and means for receiving said message intelligence signals on a selected one of said plurality of transmission channels in response to certain of said transmitted codes.

13. A mobile radio telephone system comprising a radio central including a time and space division transmission switching network, common control means for generating data message codes and means for transmitting said codes, selected ones of said codes including an abbreviated temporary address portion, a mobile station comprising means for receiving said transmitted codes, means responsive to selected ones of said codes for storing the abbreviated temporary address portion thereof, and means controlled by said last-named means for transmitting acknowledgment signals to said radio central.

14. A mobile radio telephone system comprising a radio central including a time and space division switching network, common control means for generating data message codes and means for transmitting said codes, a broadband radio transmitter, transmitting multiplex equipment connecting said switching network to said radio transmitter for providing a plurality of radio central transmitting multiplex channels, a broadband radio receiver, receiving multiplex equipment connecting said switching network to said radio receiver; a mobile station comprising means for receiving said transmitted codes, and means for transmitting a message signal burst to said switching network via a selected receiving multiplex channel in response to certain of said transmitted codes.

15. A mobile radio telephone system comprising a radio central including a time and space division switching network, common control means for generating data message codes and means for transmitting said codes, a broadband radio transmitter, transmitting multiplex equipment for providing a plurality of radio central transmitting multiplex channels connecting said switching network to said radio transmitter, a broadband radio receiver, and receiving multiplex equipment connecting said switching network to said radio receiver and a mobile station comprising means for receiving said transmitted codes and means for receiving a message signal burst from said radio central via a selected one of said radio central transmitting multiplex channels in response to certain of said transmitted codes.

16. A mobile radio telephone system comprising a radio central including common control means for generating data message codes and means for transmitting said codes, a mobile station comprising means for receiving said transmitted codes, a plurality of tone sources, a subscriber's handset, switchhook means, control means responsive to certain of said transmitted message codes for selectively connecting and disconnecting said tone sources to said subscriber's handset and means responsive to an on-hook condition of said switchhook means for disconnecting said tone sources from said subscriber's handset.

17. In a mobile radio telephone station for utilization with a radio central telephone center which includes means for generating data message function codes, means for transmitting said codes via a transmitting carrier and a time and space division transmission switching network, the combination comprising data transmitting means, data receiving means, means for tuning said data transmitting and said data receiving means to a selected carrier assignment, a message channel transmitting means, a message channel receiving means, means for tuning said receiving and transmitting message channel means to selected channel assignments, and first control means responsive to said data messages from said radio central via said transmitting carrier for controlling said message channel tuning means and second control means responsive to said data messages for transmitting acknowledgment signals to said radio central.

18. A mobile radio telephone station in accordance with claim 17 further comprising determining means operative when said transmitting carrier signal falls below a predetermined signal level at said data receiving means, and means controlled by said determining means when operated for disabling said first and second control means.

19. A mobile radio telephone system comprising a radio central including common control means for generating data message codes, and means for transmitting said codes; a mobile station comprising means for receiving said transmitted codes, means for generating an address code representative of said mobile station, means responsive to a function portion of a particular one of said message codes for indicating that a mobile station is being called, means responsive to an address portion of said particular message code for indicating that a call is being directed to a particular subscriber's mobile station, said last named means including means for comparing on a serial basis the elements of said address portion of said particular message with the elements of said generated address, register means controlled by said comparing means for storing a pseudo-address portion of said message code in said register means when said received address code and said generated address code agree, and means for transmitting an acknowledgment signal to radio central.

20. A mobile radio system in accordance with claim 19 wherein said mobile station further comprises a source of potential, alerting signal means, and control means responsive to said comparing means and to said function code responsive means for connecting said source of potential to said alerting means.

21. A mobile radio telephone system comprising common control means for generating data message codes and means for transmitting said codes, a mobile station comprising means for receiving said codes, register means, and means responsive to a function portion of a particular one of said codes for storing a pseudo-address code portion of said data message code in said register means.

22. A mobile radio telephone system in accordance with claim 21 wherein said mobile station further comprises speech message transmitting means, speech message receiving means, comparison means, means responsive to a function portion of another of said transmitted message codes for serially comparing said pseudo-address code stored in said register with a pseudo-address portion of said second message code, and means responsive to a match signal from said means for comparing for disabling said speech message transmitting and receiving means.

23. A mobile radio telephone system comprising a radio central including common control means for generating data message codes and means for transmitting said codes; a mobile station comprising means for receiving said transmitted codes, a not-available tone source, a subscriber's handset, register means wherein a pseudo-address code is stored, means responsive to the function portion of a particular one of said message codes for serially comparing the elements of the pseudo-address code stored in said register means with the elements of the pseudo-address code of said particular message, and control means responsive to said comparison means and said particular transmitted code for connecting said not-available tone source to said subscriber's handset.

24. A mobile radio telephone system comprising a radio central including a time and space division transmission switching network, common control means for generating data message codes and means for transmitting said codes, a mobile station comprising means for receiving said transmitted codes, a try-again tone source, a subscriber's handset, a first memory means responsive to a particular one of said message codes, which, when operated, indicates that said mobile station has requested service of said radio central, a second memory means responsive to other particular ones of said message codes, which, when operated, indicates that said mobile station is presently served by radio central, and mobile control means responsive to another particular one of said message codes and to the states of said first and second memory means for connecting said try-again tone source to said subscriber's handset.

25. A mobile radio telephone system in accordance with claim 24 wherein said mobile control means is energized to connect said tone source to said handset when upon receipt of said another particular message code said first memory means is in the have-requested state and said second memory means is in the not-served state.

26. A mobile radio station for utilization in a mobile radio telephone system having a radio central including a common control means for generating data message codes, means for generating a start signal proceeding in time each of said message codes and a stop signal succeeding in time each of said message codes, means for transmitting said message codes and said signals via a data channel having a selected carrier frequency; said start and said stop signals being symmetrical frequency shift signals, said start signal characterized by a positive frequency shift of said data channel carrier for a short pulse duration followed by a negative frequency shift of said carrier for a similar short pulse duration and said stop signal being characterized by a short negative frequency shift of said data channel carrier for a short pulse duration followed by a positive frequency shift of said carrier for a similar short carrier pulse duration; the combination comprising means in said mobile station for receiving said message codes and said start and said stop signals, a clock pulse source, means in said mobile station responsive to said start signal for phasing said clock pulses in said mobile station, control means responsive to said transmitted message codes for controlling said mobile station and transmitting acknowledgments to said radio central, and means responsive to said stop signal for phasing said acknowledgments to said radio central and to terminate actions within said control means.

27. In a radio communication system, the combination comprising a broadband base station transmitter having a plurality of speech channels and a data control channel; a broadband base station receiver having a plurality of speech channels and a data channel; common control means; a plurality of mobile radio-telephone stations each having a mobile transmitter which can be selectively set to any one of a plurality of transmitting frequency assignments, a receiver which can be selectively set to any one of a plurality of receiving frequency assignments and having a data channel responsive to signals from said broadband base station, and control means responsive to signals received over said data channel for selectively setting the frequency of said mobile transmitter and receiver means.

28. In a radio communication system, the combination comprising a broadband base station transmitter having a plurality of speech channels and a data control channel; a broadband base station receiver having a plurality of speech channels and a data control channel; common control means including means for generating data message signals, means for transmitting said signals via said data control channel, a plurality of mobile radio-telephone stations each having a mobile transmitter which can be selectively set to any one of a plurality of transmitting frequency assignments, a receiver which can be selectively set to any one of a plurality of receiving frequency assignments and having a data control channel responsive to signals from said broadband base station, register means, and control means responsive to signals received over said data channel for storing in said register means pseudo-address portions of said signals received over said data control channel.

29. A mobile radio telephone system comprising a radio central including common control means for generating data message codes and means for transmitting said codes; a mobile station comprising means for receiving said transmitted codes, switchhook means, register means wherein a pseudo-address code is stored, means responsive to the function portion of a particular one of said message codes for comparing the elements of the pseudo-address code stored in said register means with the elements of the pseudo-address code of said particular message, and control means responsive to said comparison means and an off-hook condition of said switchhook means for transmitting an acknowledgment to said radio central.

30. In a two-way mobile radio mobile station, a mobile receiver and transmitter, means for applying a signal of a predetermined frequency to the input terminals of said receiver, a heterodyne oscillator, a first difference frequency converter, the input of said converter being connected to said receiver input and to the output of said first oscillator, a synchronized oscillator having a nominal operating frequency equal to the center frequency of the output signal from said first difference frequency converter, the output of said first difference converter being connected to the synchronizing terminals of said synchronized oscillator, a transmitting information signal source, a second difference frequency converter, the input of said second converter being connected to said information signal source and to the output of said synchronized oscillator, and a sum frequency converter, the input of said sum converter being connected to the output of said heterodyne oscillator and to the output of said second difference converter, the output of said sum converter being connected to the output terminals of said transmitter.

31. In a two-way mobile radio mobile station arrangements for detecting the presence of a plurality of data signal carriers separated in frequency by a predetermined amount, the combination comprising a plurality of bandpass filters, means for applying data signal carriers to said bandpass filters, said bandpass filters having their passbands centered at the freqnencies of said data signal carriers, a heterodyne oscillator, a plurality of gated amplifiers, a difference frequency converter, the input of said difference converter connected to the output of said oscillator and the output of one of said bandpass filters, a sum frequency converter, the input of said sum converter being connected to the output of said oscillator and to the output of another of said bandpass filters, the outputs of said sum and difference converters each being connected to the input terminals of different ones of said gated amplifiers, a plurality of detector circuits for detecting the presence of signals having a frequency equal to the center frequency of the signals derived from said sum and said difference converters, the output terminals of each of said gated amplifiers being connected to the input terminals of separate ones of said detectors, a plurality of low pass filters, one of said filters being connected to the output terminals of each of said detectors, a plurality of second detector means connected to the outputs of said low pass filters for detecting the presence of data signals, first control means responsive to the output signals from said first and second pluralities of detectors, and second control means responsive to said first control means for selectively enabling one of said gated amplifiers and disabling the other of said gated amplifiers.

32. A mobile station in acordance with claim 31 further comprising third control means for detecting a failure of data signals on one of said data carriers, and fourth control means responsive to said failure for disabling said previously enabled gated amplifier and for enabling said previously inhibited gated amplifier.

33. In a multichannel mobile radio mobile telephone station, a system for the selection and generation of channel select signals, the combination comprising a square wave signal source having output signals occurring at regular intervals in time, a capacitor, a tapped inductance, one terminal of said capacitor connected to one terminal of said tapped inductance, gating means for selectively connecting the other terminal of said capacitor to particular taps of said tapped inductance, means for generating a coded signal representative of the connection to be effected, and means for storing said coded signal.

34. In a multichannel mobile radio mobile telephone station, a system for the selection and generation of channel select signals, the combination comprising a plurality of signal sources filter means individual to said signal sources, said filter means which can be selectively set to predetermined settings to resonate at predetermined harmonics of the fundamental frequency of said signal sources, register means for storing codes representative of the predetermined settings of said filter means, means responsive to said codes stored in said register for selectively setting said filters to said predetermined settings, and frequency converting means for combining the output signals from said filter means, the output signal from said frequency converting means being the channel select signal.

References Cited in the file of this patent

UNITED STATES PATENTS

| | | |
|---|---|---|
| 2,471,136 | Allison | May 24, 1949 |
| 2,577,141 | Mauchly et al. | Dec. 4, 1951 |
| 2,599,097 | Entz et al. | June 3, 1952 |
| 2,617,872 | Herrick | Nov. 11, 1952 |
| 2,641,692 | Lewis | June 9, 1953 |
| 2,670,435 | Mitchell | Feb. 23, 1954 |
| 2,794,972 | Dimmer | June 4, 1957 |
| 2,796,602 | Hess et al. | June 18, 1957 |
| 2,848,545 | Mitchell | Aug. 19, 1958 |
| 2,851,591 | Braak | Sept. 9, 1958 |
| 2,881,410 | Brunn | Apr. 7, 1959 |
| 2,901,543 | Braak | Aug. 25, 1959 |